US000001165H

United States Statutory Invention Registration [19]

[11] Reg. Number: H1165

Horton et al.

[43] Published: Apr. 6, 1993

[54] LAYER CAKES PREPARED WITH CRYSTALLINE SWEETENER BLENDS

[75] Inventors: Susan D. Horton, Decatur; Dorothy C. White, Argenta; Charles W. Kraut, Mt. Zion, all of Ill.

[73] Assignee: A. E. Staley Manufacturing Company, Decatur, Ill.

[21] Appl. No.: 586,316

[22] Filed: Sep. 19, 1990

Related U.S. Application Data

[63] Continuation of Ser. No. 368,734, Jun. 20, 1989, abandoned, which is a continuation-in-part of Ser. No. 304,545, Jan. 31, 1989, abandoned.

[51] Int. Cl.[5] ..... A23L 1/09

[52] U.S. Cl. ..... 426/555; 426/554; 426/658

[58] Field of Search ..... 426/554, 555, 658

[56] References Cited

U.S. PATENT DOCUMENTS

| | | | |
|---|---|---|---|
| 4,185,127 | 6/1980 | Radlove | 426/554 |
| 4,277,504 | 7/1981 | Radlove | 426/62 |
| 4,379,174 | 4/1983 | Radlove | 426/554 |
| 4,396,635 | 8/1983 | Roudebush et al. | 426/243 |
| 4,407,835 | 10/1983 | Chung | 426/552 |
| 4,419,377 | 12/1983 | Seward et al. | 426/554 |
| 4,676,991 | 6/1987 | Batterman et al. | 426/658 |
| 4,781,938 | 11/1988 | Pflaumer | 426/549 |

OTHER PUBLICATIONS

Bean et al., "Wheat Starch Gelatinization in Sugar Solutions; II. Fructose, Glucose & Sucrose: Cake Performance" Cereal Chemistry vol. 55(6) pp. 945–952—1978.

B. S. Kamel and V. F. Rasper, "Effects of Emulsifiers, Sorbitol, Polydextrose, and Crystalline Cellulose on the Texture of Reduced Calorie Cakes", *Journal of Textile Studies,* vol. 19, pp. 307–320 (1988).

J. M. Johnson et al., "Effects of High-Fructose Corn Syrup Replacement for Sucrose on Browning, Starch Gelatinization, and Sensory Characteristics of Cakes", *Cereal Chemistry,* vol. 66, No. 3, pp. 155–157 (1989).

J. M. Johnson and C. H. Harris, "Effects of Acidulants in Controlling Browning in Cakes Prepared with 100% High-Fructose Corn Syrup or Sucrose", *Cereal Chemistry,* vol. 66, No. 3, pp. 158–161 (1989).

R. M. Pangborn, "Relative Taste Intensities of Selected Sugars and Organic Acids", *Journal of Food Science,* vol. 28, pp. 726–733 (Dec., 1963).

S. Redfern et al., "Levulose-Containing Corn Syrups for the Baker", *Bakers Digest,* pp. 26, 27, 30 and 31 (Apr., 1972).

R. Henry, "High Fructose Corn Syrup", *Bakers Digest,* pp. 25, 26 and 74 (Apr., 1976).

T. Volpe et al., "Use of High Fructose Syrups in White Layer Cakes", *Bakers Digest,* pp. 38–41 (Apr., 1976).

H. Saussele et al., "High Fructose Corn Syrups for Bakery Applications", *Bakers Digest,* pp. 32–34 (Feb., 1976).

E. J. Pyler, *Baking Science and Technology,* vol. II, pp. 911–1027, 443–496 (Sosland Publ. Co., Merriman Kansas, 3d ed., 1988).

*Primary Examiner*—Robert L. Stoll

*Assistant Examiner*—Joseph D. Anthony

[57] ABSTRACT

Dry mixes and method of formulating cake mixes for high-ratio cakes prepared from blends of crystalline sucrose, crystalline fructose and, optionally, crystalline dextrose are provided. The substitution of even minor amounts of sucrose with fructose in flour/sweetener/water mixtures was found to have a marked and disproportionate effect on the gelatinization temperature (as measured by differential scanning calorimetry) of the starch in the mixture. Models for predicting the gelatinization temperature of flour/sweetener/water systems from the amounts of flour and water and amounts and types of sweetener are also provided.

2 Claims, 14 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PREDICTED GEL TEMPS FOR FRUCTOSE/SUCROSE BLENDS

PREDICTED GEL TEMPS FOR FRUCTOSE/SUCROSE BLENDS

% FRUCTOSE=0

ESTIMATED FROM 0% AND 100% FRUCTOSE DATA ONLY

% FRUCTOSE=0

GEL TEMP °C — 75 (A) ----- 77 (B) --- 79 (C) — 81 (D) —· 83 (E) -·- 85 (F)
— 87 (G) ----- 89 (H) --- 91 (I) — 93 (J) —· 95 (K) -·- 97 (L)

PREDICTED GEL TEMPS FOR FRUCTOSE/SUCROSE BLENDS

% FRUCTOSE=10

ESTIMATED FROM 0% AND 100% FRUCTOSE DATA ONLY

% FRUCTOSE=10

GEL TEMP °C — 75 (A) ----- 77 (B) --- 79 (C) -- 81 (D) — 83 (E) -- 85 (F)
— 87 (G) ----- 89 (H) --- 91 (I) -- 93 (J) — 95 (K) -- 97 (L)

PREDICTED GEL TEMPS FOR FRUCTOSE/SUCROSE BLENDS

% FRUCTOSE=20

GEL TEMP °C — 75 (A) ----- 77 (B) — — — 79 (C) — — 81 (D)
— · 83 (E) — — · 85 (F) — — 87 (G) ----- 89 (H)
— — — 91 (I) — — 93 (J) — — · 95 (K) — — · 97 (L)

ESTIMATED FROM 0% AND 100% FRUCTOSE DATA ONLY

% FRUCTOSE=20

GEL TEMP °C — 75 (A) ----- 77 (B) --- 79 (C) — 81 (D) — 83 (E) --- 85 (F)
— 87 (G) ----- 89 (H) --- 91 (I) — 93 (J) — 95 (K) --- 97 (L)

PREDICTED GEL TEMPS FOR FRUCTOSE/SUCROSE BLENDS

% FRUCTOSE=30

GEL TEMP °C — 75(A) ----- 77(B) ---- 79(C) —— 81(D)
—— 83(E) ---- 85(F) —— 87(G) ----- 89(H)
--- 91(I) —— 93(J) —— 95(K) —— 97(L)

ESTIMATED FROM 0% AND 100% FRUCTOSE DATA ONLY

% FRUCTOSE=30

GEL TEMP °C — 75 (A) ----- 77 (B) --- 79 (C) — 81 (D) —· 83 (E) -·- 85 (F)
— 87 (G) ----- 89 (H) --- 91 (I) — 93 (J) —· 95 (K) -·- 97 (L)

PREDICTED GEL TEMPS FOR FRUCTOSE/SUCROSE BLENDS

% FRUCTOSE=50

GEL TEMP °C — 75(A) ----- 77(B) --- 79(C) — 81(D)
— 83(E) — 85(F) — 87(G) ----- 89(H)
--- 91(I) — 93(J) — 95(K) — 97(L)

ESTIMATED FROM 0% AND 100% FRUCTOSE DATA ONLY

% FRUCTOSE=50

GEL TEMP °C — 75 (A) ----- 77 (B) ---- 79 (C) —— 81 (D) —— 83 (E) ---- 85 (F)
—— 87 (G) ----- 89 (H) ---- 91 (I) —— 93 (J) —— 95 (K) ---- 97 (L)

PREDICTED GEL TEMPS FOR FRUCTOSE/SUCROSE BLENDS

% FRUCTOSE=75

GEL TEMP °C — 75(A) ----- 77(B) --- 79(C) — 81(D)
— 83(E) — 85(F) — 87(G) ----- 89(H)
--- 91(I) — 93(J) — 95(K) — 97(L)

ESTIMATED FROM 0% AND 100% FRUCTOSE DATA ONLY

% FRUCTOSE=75

GEL TEMP °C — 75(A) ----- 77(B) --- 79(C) — 81(D) —· 83(E) —·· 85(F)
— 87(G) ----- 89(H) --- 91(I) — 93(J) —· 95(K) —·· 97(L)

PREDICTED GEL TEMPS FOR FRUCTOSE/SUCROSE BLENDS

% FRUCTOSE=100

GEL TEMP °C — 75(A) ----- 77(B) --- 79(C) — 81(D)
— 83(E) —- 85(F) — 87(G) ----- 89(H)
--- 91(I) — 93(J) — 95(K) —- 97(L)

ESTIMATED FROM 0% AND 100% FRUCTOSE DATA ONLY

% FRUCTOSE=100

GEL TEMP °C — 75 (A) ----- 77 (B) ---- 79 (C) —— 81 (D) —— 83 (E) ---- 85 (F)
—— 87 (G) ----- 89 (H) ---- 91 (I) —— 93 (J) —— 95 (K) ---- 97 (L)

LAYER CAKES PREPARED WITH CRYSTALLINE SWEETENER BLENDS

CROSS-REFERENCE TO RELATED APPLICATION

This application is a continuation of application Ser. No. 07/368,734, filed Jun. 20, 1989, now abandoned, which is a continuation-in-part of pending U.S. Ser. No. 07/304,545, filed Jan. 31, 1989, now abandoned.

FIELD OF THE INVENTION

This invention relates to compositions useful in preparing high-ratio cake products and to related methods of formulation.

BACKGROUND OF THE INVENTION

The use of high fructose corn syrups (HFCS) in baked goods is described in a number of articles published in *Baker's Digest* in the 1770's. S. Redfern et al., "Levulose-Containing Corn Syrups for the Baker", *Baker's Digest,* pp. 26, 27, 30 and 31 (April 1972), describes two high fructose corn syrups having differing compositions, e.g., levels of fructose of 30% or 42% fructose by weight on a dry solids basis (dsb), and the use of the 42% dsb fructose syrup as the sweetener in baked goods, particularly in yeast leavened products, although non-yeast leavened products, e.g., cakes, are mentioned.

R. Henry, "High Fructose Corn Syrup", *Baker's Digest,* pp. 25, 26 and 74 ) April, 1976), describes an HFCS having 42% dsb fructose, discusses the use of such a syrup in baking generally, and, in particular, recommends sucrose replacement levels for various baked goods, e.g., 10–30 percent replacement for sucrose in white cakes.

T. Volpe et al., "Use of High Fructose Syrups in White Layer Cakes", *Baker's Digest,* pp. 38–41 (April, 1976), describes the use of a blend of 42% dsb fructose HFCS and sucrose (60% dsb HFCS and 40% dsb sucrose) in white layer cakes with different chemical leavening agents. Volpe et al. state that the blend of HFCS and sucrose yields cakes having higher volume than cakes prepared with a sucrose control.

H. Saussele et al., "High Fructose Corn Syrups for Bakery Applications", *Baker's Digest,* pp. 32–34 (February, 1976) describe the use of 42% dsb fructose HFCS in a variety of cakes, including layer cakes (white and yellow), at varying levels of replacement for sucrose. Saussele et al. state that the height of the resulting cakes varied as the level of HFCS increased, but that the variation correlated to mixing variable and specific gravity of the batters rather than to the sugars used. Saussele also states that the texture of the cakes didn't suffer when 25 percent of the sucrose was replaced with HFCS.

The use of crystalline fructose to replace sucrose in cakes was described by M. Bean et al., "Wheat Starch Gelatinization in Sugar Solutions. II. Fructose, Glucose and Sucrose: Cake Performance", *Cereal Chemistry,* Vol. 55 (6), pp. 945–952 (1978). Bean et al. state that less water must be used to obtain the same gelatinization and, thus, the same cake volume when sucrose is completely replaced with glucose or fructose in a model cake formulation, and than even less water must be used with fructose as compared to glucose. In other words, Bean et al. found that while the addition of any of these sugars to the flour and water of a cake mix raises the gelatinization temperature, the addition of fructose raises the gelatinization temperature the least of these three sugars. Bean et al. also imply that the work described therein should serve as a model for the use of other sugars, including HFCS.

U.S. Pat. No. 4,407,835 (Chung) discloses a leavening acid system for use in baked goods to overcome difficulties (e.g., browning and uneven color) associated with the use of reducing sugars such as fructose. Chung broadly discloses the use of fructose or fructose containing material, crystalline fructose for example, but Chung states that HFCS or liquid honey are preferred and the specific examples are limited to the use of HFCS as a source of fructose. Chung discloses that 100% substitution of the fructose or fructose containing material for the sucrose in a formulation is possible, but that better results are obtained by partial replacements. While Chung broadly cites various fructose levels as a replacement for sucrose, the specific examples are limited to a 50/50 blend of sucrose and HFCS having 42% dsb fructose.

The formulation of cake mixes for baking with microwave radiant energy is disclosed by U.S. Pat. Nos. 4,396,635 (Roudebush et al.) and 4,419,377 (Seward et al.). Roudebush et al. disclose that a cake formula will give better results in a microwave oven-baked cake than current commercial mixes if several conditions are met, e.g., sugar and flour are present in a ratio of 1.4:1 to about 2:1, and an emulsifier is present at a level of from about 2% to about 10% by weight of the mix. Seward et al. also disclose that a cake formula will give better results in a microwave oven-baked cake than current commercial mixes if the following conditions are met: the emulsifier is a lipophilic emulsifier present in an amount of from 10% to about 100% of the shortening and the leavening system is used at a considerably higher level than in current commercial systems. Both Roudebush et al. and Seward et al. state that ordinary granulated sugars are suitable, e.g., sucrose, dextrose, maltose, fructose, lactose, brown and invert sugar, alone of in combination. All of the examples of Roudebush et al. and Seward et al. appear to be limited to sugar, i.e., sucrose.

SUMMARY OF THE INVENTION

In one aspect, this invention relates to a dry mix composition useful in preparing high-ratio cake products comprising a crystalline sweetener component and a flour component in a weight ratio of sweetener component to flour component of greater than 1.0, said flour component consisting essentially of a cake flour and said sweetener component consisting essentially of (i) crystalline sucrose present in an amount of at least 65% by weight of said sweetener component and (ii) crystalline fructose in an amount of from about 10% to less that 35% by weight of said sweetener component.

It has been found that the use of even relatively minor amounts of fructose in combination with sucrose as a sweetener in a cake batter has a relatively great effect on the gelatinization temperature of the starch in the cake flour.

In a related aspect, this invention relates to a method of reformulating a cake mix having a flour component consisting essentially of cake flour and a sweetener component consisting essentially of crystalline sucrose, said method comprising replacing from about 10% to less than 35% by weight of said crystalline sucrose with crystalline fructose. The amount of crystalline fructose added need not equal the amount of crystalline sucrose replaced (e.g., the amount of fructose may be less due to the greater relative sweetness of fructose). If less fructose is added than sucrose replaced, the formulation can have a lower solids level or a bulking agent (e.g., a maltodextrin) and/or fiber additive (e.g., refined corn bran) can be added to make up for lost sweetener solids.

In another aspect, this invention relates to a dry mix composition useful in preparing high-ratio cake products comprising a crystalline sweetener component and a flour component in a weight ratio of sweetener component to flour component of greater than 1.0, said flour component consisting essentially of a cake flour and said sweetener component consisting essentially of crystalline sucrose present in an amount of at least 65% by weight of said sweetener component, crystalline dextrose present in an amount of at least 10% by weight of said crystalline sweetener component and crystalline fructose present in an amount of at least 10% by weight of said crystalline sweetener component.

In another related aspect, this invention relates to a method of reformulating a cake mix having a flour component consisting essentially of a cake flour and a sweetener component consisting essentially of crystalline sucrose, said method comprising replacing from at least about 10% to less than 35% by weight of said crystalline sucrose with a sweetening amount of crystalline dextrose and a sweetening amount of crystalline fructose. As in the method described above, the sum of the sweetening amounts of fructose and dextrose need not equal the sucrose replaced.

BRIEF DESCRIPTION OF THE DRAWINGS

FIGS. 1A–7A show gelatinization temperature isotherms for flour, sweetener, and water blends predicted using data Model A (based on actual data for sweetener blends).

FIGS. 1B–7B show gelatinization temperature isotherms for flour, sweetener and water blends estimated using data Model B (based on interpolation from actual data for sucrose alone and fructose alone).

DETAILED DESCRIPTION OF THE INVENTION

Figure 1A:
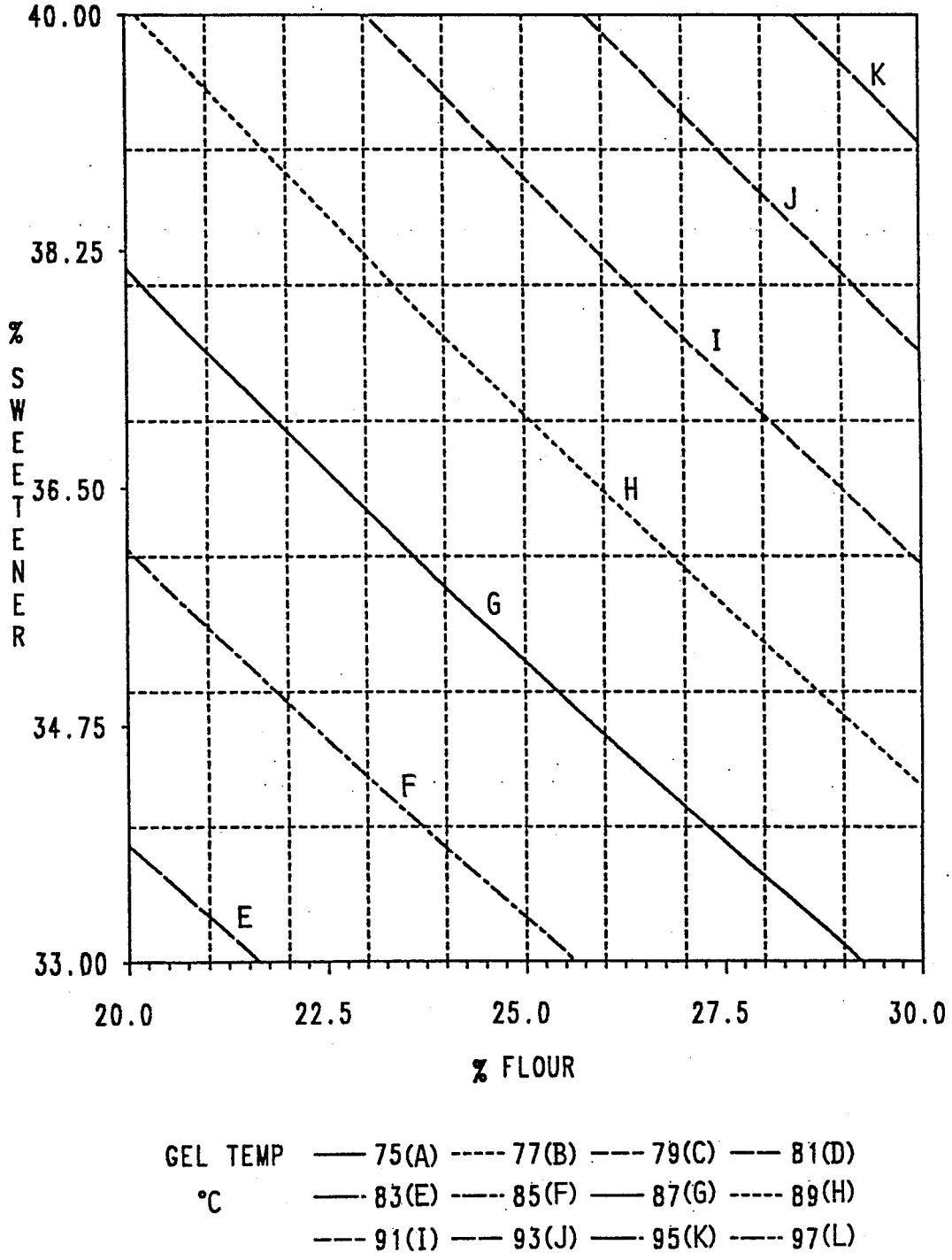
Figure 1B:
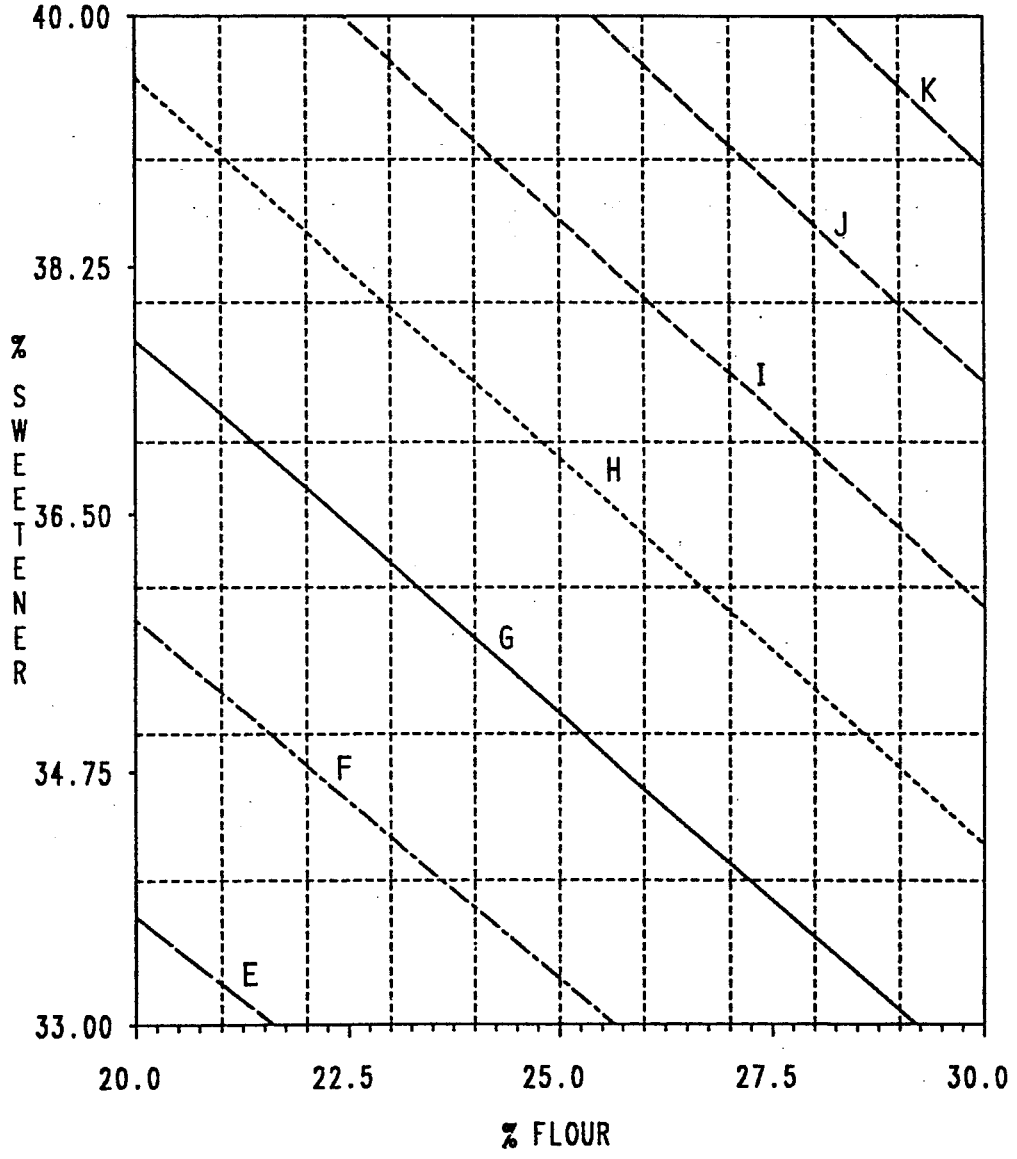

The dry mix composition of this invention is comprised of two major components, i.e., a flour component and a crystalline sweetener component. The weight ratio of the sweetener component to flour component is greater than 1.0, typically about 1.2 or 1.4, and, thus, cakes prepared therefrom are referred to as "high-ratio" cakes. However, because three different crystalline sweeteners are used as the sweetener component, the weight ratio of each specific crystalline sweetener to the flour component is typically less than 1.0.

The flour component useful in this invention consists essentially of a high-ratio cake flour. Cake flours are discussed extensively by E. J. Pyler, *Baking Science and Technology,* Vol. II, pp. 911–1027 (Sosland Publ. Co., Merriam, Kans., 3d ed. 1988), the disclosure of which is incorporated herein by reference.

Cake flours are normally milled from soft red winter wheat and soft white winter wheat varieties. The soft red winter wheats are grown principally in Ohio, Indiana, Illinois, Missouri, and Michigan, although significant production areas are also found in Kentucky, Arkansas, Tennessee, Pennsylvania and Virginia. Soft white winter wheats, on the other hand, are produced primarily in Michigan and New York, as well as in the western states of Washington, Oregon, and Idaho. In general, soft red winter wheats tend to be preferred for milling high quality cake flour, whereas soft white winter wheats are frequently specified for use in cookie, pie and cracker production.

A soft wheat four intended for use in high-sugar layer cakes typically consists of a blend of those mill streams that have the lowest protein and ash contents. It has an extraction rate in the range of 45 to 65% based on total flour. Such a flour, even though it has a finer average particle size than the remaining streams, is normally further reduced in average particle size by passage through a pin mill or by other means and is subsequently treated with chlorine gas. This treatment produces a marked improvement in the flour's cake baking performance which is generally attributed, in part, to a hydrolytic depolymerization of the starch molecule which results in increasing its hydration capacity.

Cake flour, in order to perform satisfactorily, must produce a gluten during cake batter mixing that is mellow and totally devoid of the tough properties that are associated with bread doughs. On the other hand, the gluten must possess sufficient strength and be quantitatively adequate to assure the formation of a fine foam structure in the cake. As a general rule, fancy or short patent flours milled from soft wheat varieties offer a better potential for superior crumb tenderness and softness of texture in cakes than do lower grades of flour. A typical cake flour will have the following range of specifications: Protein content of 8.5±0.5%, ash content of 0.36±0.04%, pH of 4.7±0.2, and particle size of 10±0.5 micrometers.

Chlorination is generally applied to soft wheat flours that are intended for cake production. In this process, the flour is treated with chlorine gas at a rate of 0.5 to 2.5 oz. per cwt. of flour; this lowers the flour's pH value and greatly improves its baking performance in such aspects as symmetry of product form, cake volume, and grain and texture. Chlorination is usually followed by a treatment with benzoyl peroxide, whose sole purpose it is to remove any residual traces of color that remain after chlorination. This supplemental bleaching treatment produces no discernible effect on the flour's performance, but does impart a pure white color to a low-extraction flour that has been milled so as to be free of bran particles.

The baking performance of a cake flour is most accurately established by a cake baking test carried out with a standardized procedure. In general, the baking test should preferably employ a standard formula developed specifically for the type of cake for which the flour was designed. As not all types of cake require the same functional properties in flour, it is evident that a baking test using a yellow layer cake formula may not fully evaluate a flour's suitability for the production of pound cake. The white layer cake formula is generally best suited to disclose the baking performance of a flour intended for cake baking. Details of procedures for evaluating the cakemaking potential of flour in foam-type cakes and in high-ratio white layer cake formulations are included in the *Approved Methods of the AACC* (American Association of Cereal Chemists, St. Paul, Minn., 8th ed. 1983). Such procedures can be used to select a proper cake flour for use in a particular specific embodiment of this invention.

The sweetener component of the dry mix compositions of this invention is comprised of crystalline sucrose, crystalline fructose, and, optionally, crystalline dextrose, generally with a major amount (i.e., greater than 65% by weight of crystalline sucrose, and a minor amount by weight (i.e., less than 35% by weight) of crystalline fructose and, optionally, crystalline dextrose. These three sugars are items of commerce available from a number of sources. They are typically available at a purity in excess of 99.0% by weight in a variety of particle sizes, typically in granular form (e.g., having a mean particle size between about 250 microns and 500 microns).

The amounts of each of the three crystalline sugars in the sweetener component may vary within the broad limits discussed above, but will generally include an amount of crystalline fructose sufficient to perceptibly contribute to the sweetening of the finished cake. The amount of sucrose will be at least 65% by weight of the sweetener component and, with a two component blend, the amount of fructose from about 10% to less than 35%, typically about 10% to about 20%, by weight of the sweetener component. Typical amounts of the sweeteners in a three component blend range from about 70% to about 80% sucrose and 10% to about 15% for each of dextrose and fructose, these percentages being based on the total weight of crystalline sweetener component. As will be seen from the examples set forth below, the use of a blend of crystalline dextrose and crystalline fructose to replace a portion of the sucrose in a high-ratio cake formulation yields a cake having organoleptic properties, especially texture and moisture, superior to those of a cake in which a minor amount of the sucrose is replaced by crystalline fructose alone.

The flour component and crystalline sweetener component can be, but typically need not be, premixed to form a flour/sweetener premix in formulating a dry mix composition of this invention. Any conventional system for preparing a substantially homogeneous blend can be used.

In some instances, especially for microwavable formulations, it may be desirable to co-mill the flour and crystalline sweetener components as disclosed in U.S. Pat. No. 3,694,230 (Cooke), incorporated herein by reference. In this co-milling, the sugar and flour are co-milled using a multi-pass impact mill which employs an internal particle size classifier to return oversize materials for further grinding, or which subjects the material to be treated to repeated grinding actions in several internal stages. These multi-pass impact mills involve a substantial co-action between particles of material being treated.

One of the characterizing effects of the co-milling of the sugar and flour is the formation of combined sugar-flour particles along with the size-reduced sugar particles per se and size-reduced flour particles per se, all of these particles being finely ground. A "combined sugar-flour particle" is a particle comprising individual sugar and flour particles, which have retained their individual identity, but are physically bonded to one another.

The co-milling reduces the particle diameter of the sugar and flour to a particle diameter ranging from about 1 micron to about 150 microns, with a mean particle diameter in the range of from about 10 microns to about 30 microns. The particle diameter of sugar is usually in the range of about 40 microns to about 2000 microns. Similarly, the flour particles are reduced from a size of about 1 micron to about 175 microns to a size from about 1 micron to about 120 microns.

The dry mix compositions of this invention will typically contain a number of otherwise conventional components. The precise types and amounts of such components should be appropriate for the desired type of cake and its method of preparation. For example, particular emulsifiers and/or leavening systems, such as those disclosed in U.S. Pat. Nos. 4,396,635 (Roudebush et al.) and 4,419,377 (Seward et al.), both of which are incorporated by reference, may be desirable in mixes to be prepared with microwave radiant energy rather than conventional baking ovens. Because the particular choice of a specific leavening system and/or a specific emulsifier may have a substantial impact on the texture of the finished cake, a detailed discussion of these ingredients will be included below. The disclosure of E. J. Pyler, *Baking Science and Technology*, Vol. II, pp. 919–936, and Vol. I, pp. 443–495 (Sosland Publ. Co., Merriam, Kans., 3d ed. 1988) is also incorporated by reference in this regard.

The function of leavening agents is to aerate the dough or batter and thereby render it light and porous. The porosity of a batter, which on baking is transmitted to the crumb of the finished product, is important for various reasons: it is responsible for good volume, improves eating quality by tenderizing the crumb, and contributes to the esthetic enjoyment of the final product by endowing it with such desirable attributes as uniform cell structure, bright crumb color, soft texture, enhanced palatability, and others.

Leavening can be accomplished by various means. These include yeast fermentation to generate carbon dioxide gas, the mechanical incorporation of air into doughs and batters by mixing and creaming action, and by the formulation of water vapor under the influence of the heat of baking. However, the nearly exclusive method used in leavening cake products is by chemical leaveners that consist of sodium bicarbonate and acidic agents. When these are combined and brought into contact with water, they react to generate carbon dioxide gas in controlled volumes and at controlled rates of evolution. Sodium bicarbonate ($NaHCO_3$), or baking soda, is by far the most widely used source of carbon dioxide in chemical leavening systems, primarily because of its low cost, east of handling, absence of toxicity, general high purity, and absence of aftertaste in the baked product when it has fully reacted.

Common leavening acids used in conjunction with baking soda include:

monocalcium phosphate monohydrate (MCP);
anhydrous monocalcium phosphate (AMCP);
sodium acid pyrophosphate (SAPP);
sodium aluminum phosphate (SALP);
sodium aluminum sulfate (SAS);
monopotassium tartrate (cream of tartar);
dicalcium phosphate dihydrate (DCP); and
glucono-delta-lactone (GDL).

Baking powders can be used as the leavening agent. Baking powders conform to the following general definition issued by the U.S. Department of Agriculture: "Baking powder is the leavening agent produced by the mixing of an acid-reacting material and sodium bicarbonate, with or without starch or flour. It yields not less than 12% of available carbon dioxide. The acid-reacting materials in baking powder are: (1) tartaric acid or its acid salts; (2) acid salts of phosphoric acid; (3) compounds of aluminum; or (4) any combination in substantial proportions of the foregoing." This standard is specific in designating sodium bicarbonate as the only permissible alkaline ingredient of baking powders, and in setting a minimum limit of 12% of available carbon dioxide based on the weight of the product. The much broader selectivity allowed for the acid-reacting salts permits the formulation of baking powders with markedly different properties.

Baking powders are usually classified, according to their reaction rates, into fast-acting, slow-acting, and double-acting types. Fast-acting baking powders release most of their potential gas volume during the first few minutes of contact with liquid, thus imposing the need for fairly rapid processing of the dough or batter to avoid excessive volume loss. The slow-acting powders release practically none of their gas volume at low temperatures and, hence, require oven heat to achieve complete reaction and full evolution of the carbon dioxide gas. The double-acting powders react partially at low temperatures to form smooth-flowing batters, but require high temperatures for complete reaction. The latter types of baking powder, formulated by the manufacturer to yield a uniform, regulated action, are the most commonly used in commercial cake baking.

Representative formulations of commercial baking powders are given below.

COMMERCIAL BAKING POWDER COMPOSITIONS

| | Types (double acting) | | | | | | | |
|---|---|---|---|---|---|---|---|---|
| Ingredients | A | B | C | D | E | F | G | H |
| Baking soda, granular | 27 | 30 | 30 | 30 | 30 | 30 | 30 | 30 |
| Monocalcium phosphate mono-hydrate (MCP) | — | 8.7 | 12 | 5.0 | 5.0 | — | 5.0 | 10 |
| Sodium aluminum sulfate (SAS) | — | 21 | 21 | 26 | — | — | — | — |
| Sodium acid pyrophosphate (SAPP) | — | — | — | — | 38 | 44 | 38 | — |
| Sodium aluminum phosphate (SALP) | — | — | — | — | — | — | — | 22 |
| Cream of tartar | 47 | — | — | — | — | — | — | — |
| Tartaric acid | 6 | — | — | — | — | — | — | — |
| Calcium sulfate | — | 13.7 | — | — | — | — | — | — |
| Calcium carbonate | — | — | — | 20 | — | — | — | — |
| Calcium lactate | — | — | — | — | 2.5 | — | — | — |
| Corn starch (redried) | 20 | 26.6 | 37 | 19 | 24.5 | 26 | 27 | 38 |

Specific leavening systems have been disclosed in the context of fructose as a sweetener, e.g., U.S. Pat. Nos. 4,277,504 (Radlove); 4,379,174 (Radlove); and 4,407,835 (Chung), the disclosures of which are incorporated herein, but the use of such systems should not be necessary in the practice of this invention.

As noted above, the selection of a chemical leavening system may be important in the production of a tender and light cake from particular batter formulations baked in the microwave as disclosed in U.S. Pat. No. 4,396,635 (Roudebush et al.). the leavening used by Roudebush et al. comprises a baking soda, e.g., sodium, potassium, or ammonium bicarbonate, and a baking acid, preferably either sodium aluminum phosphate and monocalcium phosphate or mixtures thereof. Preferably, the amount of baking soda comprises from about 1.00% to about 2.50%, the amount of sodium aluminum phosphate comprises from about 0.80% to about 1.00%, and the amount of monocalcium phosphate is from about 0.3% to about 2.0% of the total mix, preferably 1.0 to 2.0%. To achieve the best height and texture, Roudebush et al. found that increased amounts of a leavening system comprising a specific combination of the slow-acting leavening agent, sodium aluminum phosphate, and the faster-acting monocalcium phosphate works best.

The shortening suitable for use herein can be plastic or fluid; however, a major part of the shortening is typically a liquid oil. The oil portion of the shortening can be derived from naturally occurring liquid triglyceride oil such as cottonseed oil, soybean oil, peanut oil, canola oil, sesame oil, coconut oil, corn oil, and sunflower seed oil. Fish oils such as herring, menhaden and whale oil can also be used herein. Also suitable are liquid oil fractions obtained from palm oil, lard and tallow, as, for example, by graining or directed interesterification, followed by separation of the oil. Oils predominating in glycerides of unsaturated acids may require some hydrogenation to maintain flavor. The shortenings typically used herein are soybean oil, hydrogenated soybean oil, corn oil, palm oil, hydrogenated palm oil, lard and tallow oils.

Of course, mixtures of the above oils or other oils can also be used herein as can solid fatty materials, such as saturated triglyceride fats. In general, from about 1.5% to about 20% of triglycerides which are solid at 25° C. can be added to a liquid oil. At least about 80% of the fatty glycerides should be in a beta phase.

As discussed by Pyler, above the choice of type and amount of emulsifier can have a substantial effect on the texture and perceived moisture of the finished cake. Suitable emulsifiers include lactylated mono- and diglycerides, propylene glycol monoesters, polyglycerol esters, sorbitan esters, diacetylated tartaric acid esters of mono- and diglycerides, citric acid esters of monoglycerides, stearoly-2-lactylates, polysorbates, succinylated monoglycerides, acetylated monoglycerides, ethoxylated monoglycerides, lecithin, sucrose monoester, and mixtures thereof.

By "lactylated mono- and diglycerides" are meant lactic acid esters of mono- and diglycerides of fatty acids having from about 14 to 22 carbon atoms, in which from 10% to 35% of the hydroxyls of the glycerides are esterified with lactic acid or polymers of lactic acid. Preferred for use herein is the lactylated monoglyceride of soybean hardstock.

By propylene glycol monoesters are meant those esters of 1,2-propylene glycol and fatty acids having from 14 to 22 carbon atoms. Typical propylene glycol monoesters are propylene glycol monopalmitate, propylene glycol monostearte, and propylene glycol monobehenate.

The fatty acids used to esterify the propylene glycol and to prepare the lactylated mono- and diglycerides can be saturated or trans-unsaturated carboxylic acid radicals having from 14, 16, 18, 20 or 22 carbon atoms. A small amount of cis-unsaturated carboxylic acids can be present. Examples of suitable fatty carboxylic acids are myristic, palmitic, margaric, stearic, arachidic, behenate, elaidic and brassidic acids.

Polyglycerol esters suitable for use typically have an average of from 2 to 10 glycerol units and from 1 to 3 fatty acyl groups of from 14 to 18 carbon atoms per glycerol moiety.

Sorbitan esters suitable for use typically have from 1 to 3 fatty acyl groups having from 14 to 18 carbon atoms each. Typical sorbitan esters have one fatty acyl group having from 14 to 18 carbon atoms.

Typical succinylated, acetylated, and ethoxylated monoglycerides are those having acyl groups from about 14 to about 18 carbon atoms.

A typical mixture of emulsifiers is propylene glycol monoesters and lactylated mono- and diglycerides, the ratio of propylene glycol monoesters to lactylated mono- and diglycerides being from 0.4:1 to 1:1. Also typical is a mixture of propylene glycol monoesters and polyglycerol esters, the ratio of propylene glycol monoesters to polyglycerol esters being from 1:1 to 2.2:1.

Another conventional mixture of emulsifiers is a mixture of propylene glycol monoesters, lactylated mono- and diglycerides and polyglycerol esters, e.g., mixtures containing the emulsifiers in the following parts by weight: 4 to 12 parts polyglycerol esters; 10 to 30 parts propylene glycol monoesters; and 2 to 15 parts lactylated mono- and diglycerides.

Another conventional mixture is 1 part polyglycerol esters, 2 parts propylene glycol monoesters of palm oil, and 1 part of lactylated monoglycerides.

In addition to the components discussed above, a typical cake mix will also include conventional cake additives. The term "conventional cake additives" includes ingredients such as flavors, thickeners (e.g., hydrophilic colloids), nutrients, antixoidants and antimicrobial agents, non-fat milk solids, egg solids, starches, etc.

Suitable hydrophilic colloids can include natural gum material such as gum tragacanth, locust bean gum, algin, gelatin, Irish Moss, pectin, and gum arabic. Synthetic gums such as water-soluble salts of carboxymethyl cellulose can also be used.

Non-fat milk solids which can be used in the composition of this invention are the solids of skim milk and include proteins, mineral matter and milk sugar. Other proteins such as cesein, sodium caseinate, calcium caseinate, modified casein, sweet dairy whey, modified whey, and whey protein concentrate can also be used herein. Generally, these solids will be used from about 0% to about 5% of the weight of the dry mix.

Starches can also be added to the mix. Examples of suitable starches include corn, waxy maize, wheat, rice, potato, and tapioca starches.

For many mixes, it is accepted practice for the user to add the required amount of eggs in the course of preparation and this practice may be followed just as well with the present mixes. If desired, however, the inclusion of egg solids, in particular, egg albumen and dried yolk, in the mix are allowable alternatives. Soy isolates may also be used herein in place of the egg albumen.

Dry or liquid flavoring agents may be added to the mix. These include cocoa, vanilla, chocolate, coconut, peppermint, pineapple, cherry, nuts, spices, salts, flavor enhancers, among others. Any suitable flavoring agent used to prepare baked goods can be used herein.

As used herein, baked goods includes cakes, brownies, cupcakes and other types of baked goods which would ordinarily contain a leavening agent. However, a particular benefit has been recognized in the area of high-ratio layer cakes.

All types of flavor and sugar-based prepared cake mixes can be made using the above compositions. Yellow cakes, chocolate cakes, devil's food cakes, marble cakes, spice cakes, pineapple cakes, and many other layer cakes of excellent quality can be prepared simply by adding water and eggs to the dry mix in a single mixing step or miltiple mixing steps followed by microwave baking.

In the typical production of a dry cake mix, the emulsifier is first dissolved in the oil or fat to produce an emulsified shortening. For best results, the emulsifier is melted and added to the shortening at a temperature above the melting point of the emulsifier to insure a homogeneous blend. Any conventional methods of incorporating the emulsifier and shortening into the mix can also be used.

The flour, sugar, leavening agent, emulsified shortening, and additional ingredients are then mixed together in a conventional manner to produce a dry cake mix. For example, the emulsified shortening and other ingredients can be combined with the sugar, flour or co-milled sugar-flour mixture by admixing these components in a planetary bowl mixer, a ribbon blender, a high-speed rotary mixer, or in other conventional mixers. Preferably, however, the shortening containing the emulsifier is first mixed with the sugar-flour mixture, for example, in a paddle mixer, a ribbon blender, or a high-speed rotary mixer to form an essentially homogeneous sugar-flour-shortening-emulsifier blend, and then the additional ingredients are admixed (also in a conventional mixer) with this blend.

A batter is prepared from the dry mix by combining it with aqueous ingredients, typically water or milk and, optionally, eggs.

The total amount of water in the batter has an effect on the gelatinization temperature of the starch in the cake flour and, thus, upon the texture and volume of the resulting finished cake, especially when dextrose and fructose are substituted for sucrose, as discussed by M. Bean et al., cited above. In general, the amount of water in an otherwise conventional batter formulation, in relation to the amounts of the flour component and crystalline sweetener component, should be adjusted to obtain a gelatinization temperature of about 90° C. to obtain a cake having satisfactory volume and texture. This adjustment may be a reduction in the amount of water in relation to the other ingredients, an increase in the amount of the floor component and the crystalline sweetener component, or a combination thereof. However, the adjustment must not be so great as to adversely affect the specific gravity of the batter and result in reduction volume and unacceptable texture.

As will be discussed in greater detail below, it has been found that the effect of partial substitution of sucrose with fructose on the gelatinization temperature of the starch in a flour/sweetener/water mixture cannot be predicted from the gelatinization temperatures of a flour/sucrose/water system and a flour/fructose/water system. In other words, simple interpolation between a plot of the gelatinization temperatures for a flour/sucrose/water system and a plot of the gelatinization temperatures for a flour/fructose/water system cannot be used to predict the gelatinization temperature of a flour/sucrose/frutose/water system.

It has been found that the partial substitution of sucrose with frutose in general lowers the gelatinization temperature of a flour/sweetener/water system (as compared to a system where the sweetener consists only of sucrose) more than would be predicted on the basis of interpolation from a flour/sucrose/water system and a flour/fructose/water system. For example, at a 10% by weight substitution of sucrose with fructose, the gelatinization temperature is approximately 1° C. lower than would be estimated by interpolation from a 100% fructose system and a 100% sucrose system and at each of 20%, 30%, 50% and 75% substitutions, the gelatinization temperature is approximately 2° C. lower than would be estimated by interpolation from a 100% fructose system and a 100% sucrose system. Thus, for a batter sweetened with a blend of sucrose and fructose to have a predetermined gelatinization temperature, the observed disproportionate effect of fructose in lowering the gelatinization temperature of starch (as compared to a system where the sweetener consists only of sucrose) should be taken into account.

The method of mixing the batter prior to baking can be any of the conventional mixing methods as described by E. Pyler, discussed above, at pages 989-999, the disclosure of which is incorporated by reference. Examples of such methods include the creaming method (aeration of a mixture of shortening and dry ingredients followed by incorporation of liquid ingredients, typically in increments), the flour-batter method (separate creaming of flour and shortening and whipping of eggs and sugar, combination of cream and whip followed by addition of remaining liquids), and the single-stage method (all major ingredients added prior to mixing in stages followed by addition of baking powder in last mixing stage). Continuous batter mixing is commonly employed in conventional bakeries. The two most common continuous mixing apparatus types are the compact rotor-stator mixing chamber type and the tubular scraped- or swept-surface mixer. Batter temperature during mixing typically has an effect on specific gravity of the batter, and, in turn, on the tenderness, grain, texture and volume of the finished cake. Accordingly, factors which affect specific gravity should be taken into account during mixing and deposition into the desired cake baking pan.

The following examples will serve to illustrate features and/or advantages of particular embodiments of this invention, but should not be construed to limit the invention. All parts, percentages and ratios set forth in the examples and elsewhere are by weight unless noted otherwise.

EXAMPLES

The following description and discussion will focus first upon the use of differential scanning calorimetry (DSC) in measuring the gelatinization temperatures of various flour/sweetener/water systems and the use of the data obtained thereby to generate gelatinization curves for each system. Second, specific cake batter formulations and the evaluation of cakes prepared therefrom will be set forth.

GELATINIZATION TEMPERATURE OF FLOUR/SWEETENER/WATER BLENDS

Introduction

Differential Scanning Calorimetry (DSC) is particularly suitable for the study of starch gelatinization in basic starch/water/sugar systems as well as in baked products. It can simulate the baking process by heat denaturation of the starch and protein in a sample and simultaneously measure the heat flow through that sample as a function of temperature. The DSC provides fundamental information such as the temperature at which starch gelatinizes (as measured by onset temperature), the temperature ranges of starch gelatinization, as well as the total heat absorbed in millijoules and amount of heat absorbed per gram of sample.

Materials

Intrumentation—Analyses were performed on the Perkin-Elmer DSC 7 series with compatible analyzer and computer in a nitrogen atmosphere of 18 PSI.

Flour—Pillsbury Sno Sheen High Ratio Bakery Cake Flour 3562 was used in all of the DSC basic work (lot number: C8N38 81858729). It had 10.87% moisture.

Fructose—KRYSTAR® 300 crystalline fructose, lot number LK7L27A, manufactured by A. E. Staley Manufacturing Company was the fructose used. It contained 0.07% moisture.

Sucrose—Imperial Pure Cane Sugar manufactured by Imperial Sugar Company, Bakers Granulated Sucrose with 0.18% moisture was used.

Methods

A 7×3×3 factorial experimental design was set up to generate data. The independent variables were percent of fructose in the sweetener system (0, 10, 20, 30, 50, 75, 100) as well as the percent total sweetener in the formula (32, 37, 45) and the percent of total flour in the formula (20, 25, 35). The amount of water in the formula is 100% minus the total sweetener and flour. The response measured was starch gelatinization temperature in degrees Celsius as determined by the onset temperature on the DSC Thermogram. (Onset temperature is found by projecting the tangent of the point of greatest slope of a plot of heat flow (mm) versus temperature (C) to the temperature abscissa.)

Samples of 5 to 10 milligrams were prepared by the addition of the individual ingredients to aluminum DSC pans in the order of flour, fructose, sucrose, and water and allowed to equilibrate two hours at room temperature before heating. Samples were then re-equilibrated in the DSC at 10° C. for 10 minutes before being heated from 10° C. to 120° C. at a rate of 10° C./minute.

Reproducibility and reliability of the sample preparation technique was evaluated with the running of duplicates. At least one known control was included in each run to check for variations in the ingredients, the DSC itself, as well as in the preparation. Reproducibility was shown to be excellent with a standard deviation of 0.9° C.

The raw data from each set of observations (OBS) from the DSC experiments are set forth in Table 1, below.

TABLE 1

GELATINIZATION TEMPERATURES OF FLOUR/SWEETENER/WATER BLENDS

| OBS | Fructose in Sweetener (Wt. % of Sweetener) | Blend Composition: Flour (Wt. % of Blend) | Sweetener (Wt. % of Blend) | Water (Wt. % of Blend) | Gelatinization Temperature (°C.) |
|---|---|---|---|---|---|
| 1 | 0 | 20.0663 | 37.1476 | 42.7861 | 86.149 |
| 2 | 0 | 20.0669 | 32.9431 | 46.9900 | 83.555 |
| 3 | 0 | 24.7525 | 37.6238 | 37.6238 | 89.718 |
| 4 | 0 | 24.8344 | 40.3974 | 34.7682 | 94.173 |
| 5 | 0 | 24.9169 | 37.0432 | 38.0399 | 87.722 |
| 6 | 0 | 25.4125 | 32.8383 | 41.7492 | 85.184 |
| 7 | 0 | 27.9339 | 50.4132 | 21.6529 | 109.669 |
| 8 | 0 | 27.9534 | 37.1048 | 34.9418 | 90.507 |
| 9 | 0 | 29.0936 | 39.1813 | 31.7251 | 93.597 |
| 10 | 0 | 29.2899 | 38.7574 | 31.9527 | 93.440 |
| 11 | 0 | 29.3179 | 39.0421 | 31.6401 | 93.069 |
| 12 | 0 | 29.3510 | 38.4956 | 32.1534 | 94.148 |
| 13 | 0 | 29.4721 | 38.1232 | 32.4047 | 93.686 |
| 14 | 0 | 29.5252 | 38.7240 | 31.7507 | 93.990 |
| 15 | 0 | 29.5380 | 37.7888 | 32.6733 | 93.895 |
| 16 | 0 | 29.5918 | 38.4840 | 31.9242 | 93.963 |
| 17 | 0 | 29.7697 | 39.3092 | 30.9211 | 94.908 |
| 18 | 0 | 29.8333 | 40.0000 | 30.1667 | 97.850 |
| 19 | 0 | 29.8817 | 38.6095 | 31.5089 | 94.640 |
| 20 | 0 | 30.0664 | 32.8904 | 37.0432 | 86.801 |
| 21 | 0 | 32.8904 | 43.6877 | 23.4219 | 104.687 |
| 22 | 0 | 37.7483 | 37.2517 | 25.0000 | 99.676 |
| 23 | 10 | 19.8020 | 37.9538 | 42.2442 | 85.743 |

TABLE 1-continued

GELATINIZATION TEMPERATURES OF FLOUR/SWEETENER/WATER BLENDS

| OBS | Fructose in Sweetener (Wt. % of Sweetener) | Blend Composition: Flour (Wt. % of Blend) | Sweetener (Wt. % of Blend) | Water (Wt. % of Blend) | Gelatinization Temperature (°C.) |
|---|---|---|---|---|---|
| 24 | 10 | 19.9336 | 45.0166 | 35.0498 | 92.411 |
| 25 | 10 | 20.0331 | 31.2914 | 48.6755 | 78.626 |
| 26 | 10 | 26.4848 | 40.6100 | 32.9053 | 93.968 |
| 27 | 10 | 27.0181 | 45.6343 | 27.3476 | 98.060 |
| 28 | 10 | 27.5459 | 38.3973 | 34.0568 | 90.909 |
| 29 | 10 | 27.6490 | 32.1192 | 40.2318 | 83.721 |
| 30 | 10 | 34.4262 | 32.1311 | 33.4426 | 87.954 |
| 31 | 10 | 34.7176 | 38.7043 | 26.5781 | 95.237 |
| 32 | 20 | 19.6694 | 33.5537 | 46.7769 | 80.279 |
| 33 | 20 | 19.8347 | 40.0000 | 40.1653 | 86.530 |
| 34 | 20 | 20.2995 | 37.2712 | 42.4293 | 82.781 |
| 35 | 20 | 24.3506 | 41.0714 | 34.5779 | 89.773 |
| 36 | 20 | 24.9164 | 37.2910 | 37.7926 | 85.098 |
| 37 | 20 | 25.0423 | 33.1641 | 41.7936 | 81.664 |
| 38 | 20 | 29.4893 | 34.1021 | 36.4086 | 85.035 |
| 39 | 20 | 29.6236 | 39.6072 | 30.7692 | 90.693 |
| 40 | 20 | 29.9501 | 36.9384 | 33.1115 | 87.082 |
| 41 | 30 | 19.3600 | 45.7600 | 34.8800 | 89.345 |
| 42 | 30 | 19.8664 | 38.8982 | 41.2354 | 83.907 |
| 43 | 30 | 20.0988 | 32.1252 | 47.7759 | 78.116 |
| 44 | 30 | 27.1829 | 32.1252 | 40.6919 | 81.781 |
| 45 | 30 | 27.1973 | 45.4395 | 27.3632 | 95.930 |
| 46 | 30 | 27.5000 | 39.0000 | 33.5000 | 88.258 |
| 47 | 30 | 27.5168 | 31.5436 | 40.9396 | 80.540 |
| 48 | 30 | 27.6490 | 45.0331 | 27.3179 | 97.880 |
| 49 | 30 | 34.7682 | 39.4040 | 25.8278 | 95.379 |
| 50 | 30 | 34.8837 | 38.7043 | 26.4120 | 95.262 |
| 51 | 30 | 34.9338 | 45.0331 | 20.0331 | 102.600 |
| 52 | 30 | 34.9418 | 32.4459 | 32.6123 | 84.567 |
| 53 | 30 | 35.1082 | 44.7587 | 20.1331 | 100.156 |
| 54 | 50 | 19.4444 | 40.0327 | 40.5229 | 82.631 |
| 55 | 50 | 19.7368 | 32.7303 | 47.5329 | 77.631 |
| 56 | 50 | 19.9670 | 36.7987 | 43.2343 | 79.614 |
| 57 | 50 | 24.6711 | 36.6776 | 38.6513 | 83.386 |
| 58 | 50 | 24.8756 | 40.4643 | 34.6600 | 86.072 |
| 59 | 50 | 25.0000 | 33.3333 | 41.6667 | 81.193 |
| 60 | 50 | 29.5567 | 40.8867 | 29.5567 | 89.486 |
| 61 | 50 | 29.7837 | 37.1048 | 33.1115 | 85.212 |
| 62 | 50 | 29.8013 | 40.0662 | 30.1325 | 88.507 |
| 63 | 50 | 30.2170 | 32.7212 | 37.0618 | 81.157 |
| 64 | 75 | 20.0328 | 40.2299 | 39.7373 | 81.758 |
| 65 | 75 | 20.3361 | 32.7731 | 46.8908 | 78.241 |
| 66 | 75 | 20.6723 | 36.4706 | 42.8571 | 79.349 |
| 67 | 75 | 25.2046 | 32.4059 | 42.3895 | 80.214 |
| 68 | 75 | 25.2508 | 36.9565 | 37.7926 | 81.992 |
| 69 | 75 | 25.5462 | 40.1681 | 34.2857 | 84.155 |
| 70 | 75 | 29.7342 | 33.5548 | 36.7110 | 79.464 |
| 71 | 75 | 30.0493 | 37.2742 | 32.6765 | 84.778 |
| 72 | 75 | 30.1794 | 40.1305 | 29.6900 | 88.155 |
| 73 | 100 | 19.7020 | 33.9404 | 46.3576 | 77.205 |
| 74 | 100 | 19.9667 | 37.1048 | 42.9285 | 79.720 |
| 75 | 100 | 20.3306 | 39.6694 | 40.0000 | 80.543 |
| 76 | 100 | 24.8333 | 40.0000 | 35.1667 | 84.122 |
| 77 | 100 | 25.0000 | 33.0000 | 42.0000 | 78.360 |
| 78 | 100 | 25.2073 | 36.8159 | 37.9768 | 80.770 |
| 79 | 100 | 27.7409 | 37.2093 | 35.0498 | 82.463 |
| 80 | 100 | 27.8333 | 51.0000 | 21.1667 | 97.189 |
| 81 | 100 | 27.8689 | 37.7049 | 34.4262 | 82.191 |
| 82 | 100 | 27.9339 | 50.7438 | 21.3223 | 96.220 |
| 83 | 100 | 28.1924 | 38.4743 | 33.3333 | 83.381 |
| 84 | 100 | 28.2430 | 49.0969 | 22.6601 | 93.929 |
| 85 | 100 | 28.4526 | 43.9268 | 27.6206 | 88.616 |
| 86 | 100 | 29.7521 | 40.3306 | 29.9174 | 86.148 |
| 87 | 100 | 30.0501 | 33.0551 | 36.8948 | 79.847 |
| 88 | 100 | 32.8383 | 43.8944 | 23.2673 | 95.592 |
| 89 | 100 | 32.9431 | 44.6488 | 22.4080 | 92.314 |
| 90 | 100 | 33.6700 | 44.2761 | 22.0539 | 94.860 |
| 91 | 100 | 33.7838 | 44.2568 | 21.9595 | 93.414 |
| 92 | 100 | 33.8926 | 44.7987 | 21.3087 | 94.181 |
| 93 | 100 | 33.8954 | 44.0135 | 22.0911 | 92.518 |
| 94 | 100 | 33.8954 | 44.6880 | 21.4165 | 93.687 |
| 95 | 100 | 33.9559 | 44.3124 | 21.7317 | 92.569 |
| 96 | 100 | 34.0034 | 43.7186 | 22.2781 | 93.467 |
| 97 | 100 | 34.2809 | 43.8127 | 21.9064 | 93.289 |
| 98 | 100 | 34.9564 | 37.8913 | 27.5124 | 86.576 |
| 99 | 100 | 34.7039 | 43.7500 | 21.5461 | 93.184 |
| 100 | 100 | 34.9103 | 50.2447 | 14.8450 | 102.556 |
| 101 | 100 | 35.0993 | 44.0397 | 20.8609 | 93.679 |
| 102 | 100 | 37.4384 | 37.1100 | 25.4516 | 86.992 |
| 103 | 100 | 37.9368 | 51.2479 | 10.8153 | 104.159 |
| 104 | 100 | 41.2541 | 38.2838 | 20.4620 | 90.393 |
| 105 | 100 | 41.4474 | 43.9145 | 14.6382 | 98.309 |
| 106 | 100 | 41.9301 | 38.1032 | 19.9667 | 92.218 |

The data was then used to generate an extrapolated model which would predict starch gelatinization temperatures for specific ratios of flour, sweetener and water.

The model using all data (106) points is:

(A) GEL TEMP = 87.13878925 − 0.09478077*AMTFRUCTX + 0.63076843*FLOURX + 1.08096980*SWEETX + 0.00087436*AMT2 + 0.03054401*FLOSWE − 0.00395761*AMTSWE − 0.00255336*AMTFLO + 0.01272042*S2 + 0.00686185*F2

Where

AMTFRUCTX=% Fructose in the Sweetener Blend−49.38679245

FLOURX=% Flour in the System−28.30888233

SWEETX=% Total Sweetener in the System−39.25321635

AMT2=AMTFRUCTX**2

FLOSWE=FLOURX*SWEETX

AMTSWE=AMTFRUCTX*SWEETX

AMTFLO=AMTFRUCTX*FLOURX

S2=SWEETX**2

F2=FLOURX**2

Using only data for 0% and 100% fructose (56 data points), an extrapolated model which would estimate starch gelatinization temperatures was constructed and is as follows:

(B) GEL TEMP = 90.93549529 − 0.10630857*AMTFRUCTX + 0.66068893*FLOURX + 1.15038032*SWEETX + 0.02502360*FLOSWE − 0.00369736*AMTSWE − 0.00236207*AMTFLO + 0.01152453*S2 + 0.00905146*F2

Where

AMTFRUCTX=% Fructose in the Sweetener Blend−60.71428571

FLOURX=% Flour in the System−30.15873147

SWEETX=% Total Sweetener in the System−40.62380964

FLOSWE=FLOURX*SWEETX
AMTFLO=AMTFRUCTX*FLOURX
S2=SWEETX**2
F2=FLOURX**2

Model A was used to generate the gelatinization temperature isotherms of FIGS. 1A–7A and Model B was used to generate the gelatinization temperature isotherms of FIGS. 1B–7B. A comparison of FIGS. 2A and 2B shows that the predicted gelatinization temperature isotherms (predicted from actual data of total and partial substitution) vary by about 1° C. from the estimated gelatinization isotherms (estimated from actual data of only total substitution) at a 10% level of substitution of fructose for sucrose and by about 2° C. higher at each of 20%, 30%, 50% and 75% levels of substitution. In other words, at a 10% level of substitution of fructose for sucrose, a given composition has a gelatinization temperature about 1° C. lower than would have been estimated, and at 20%, 30%, 50% and 75% levels, about 2° C. lower than would have been estimated.

Figure 2A:
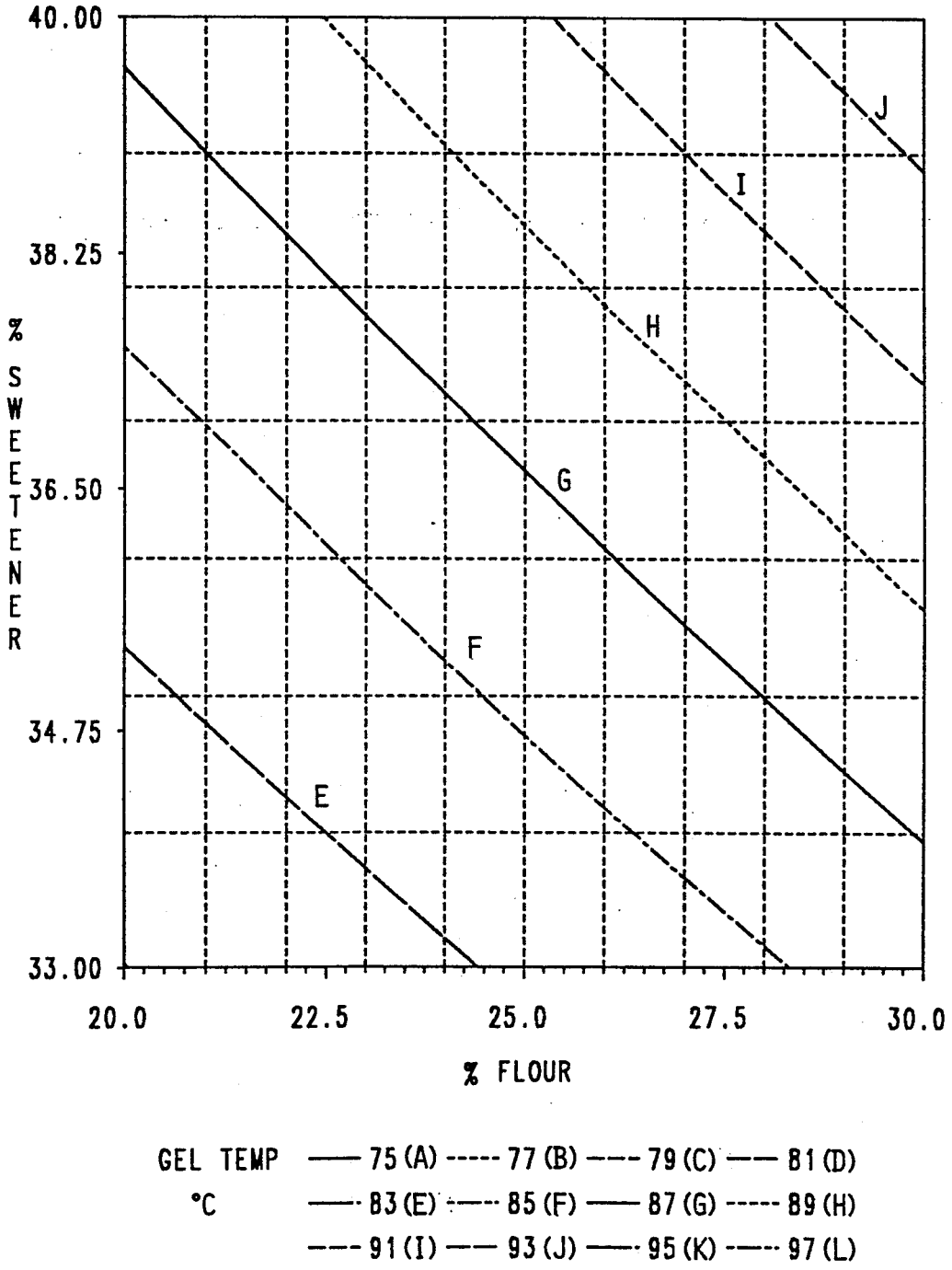
Figure 2B:
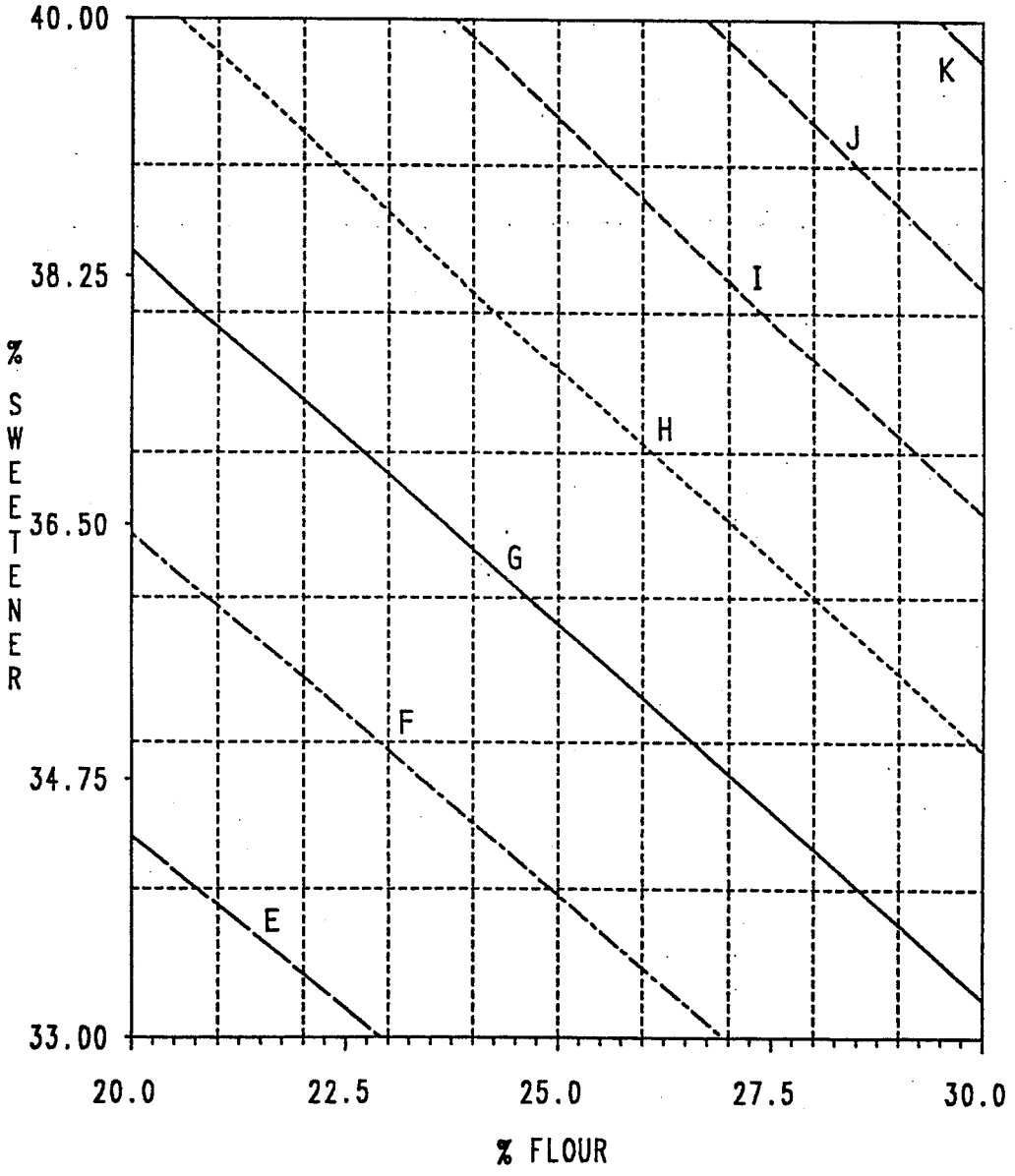
Figure 3A:
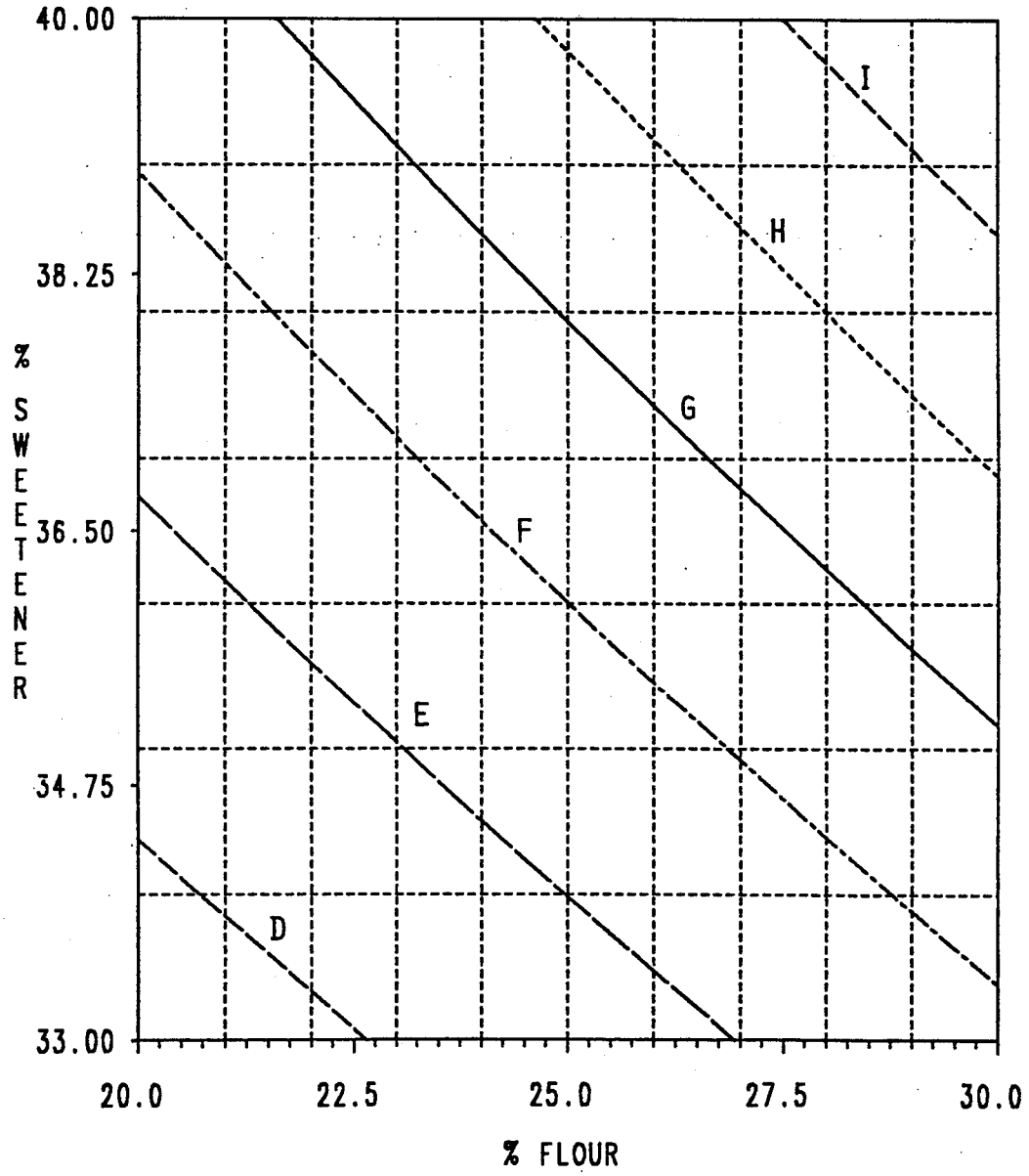
Figure 3B:
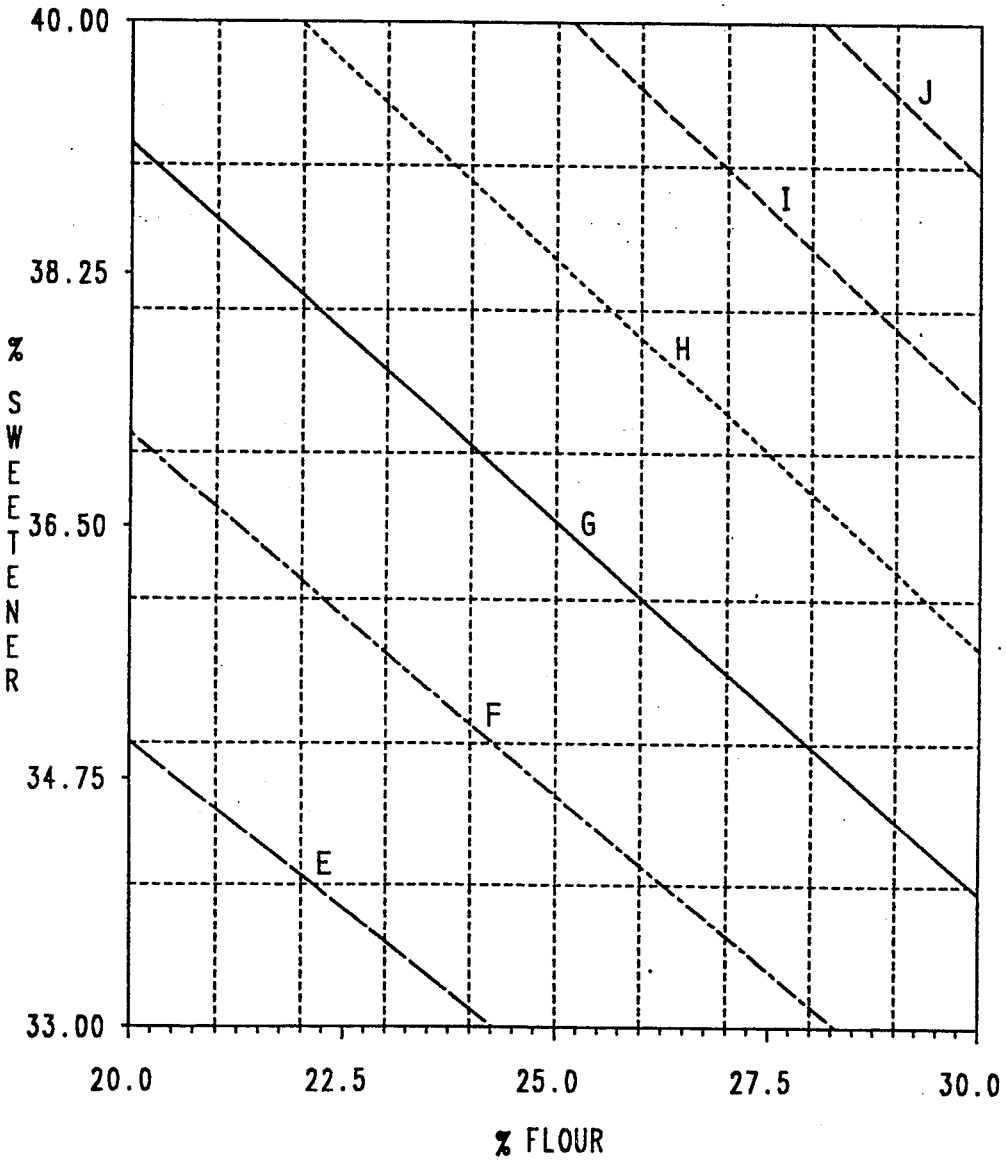
Figure 4A:
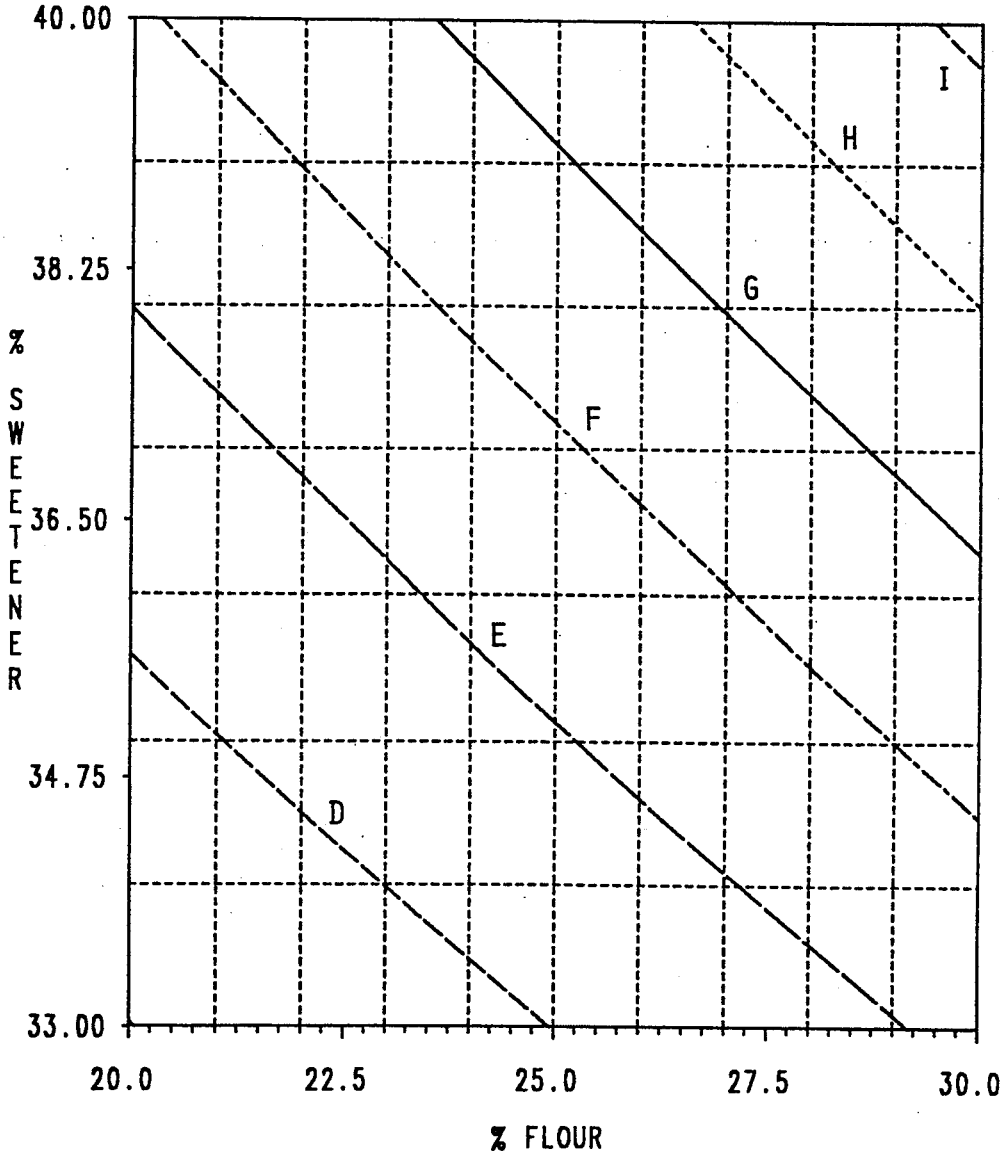
Figure 4B:
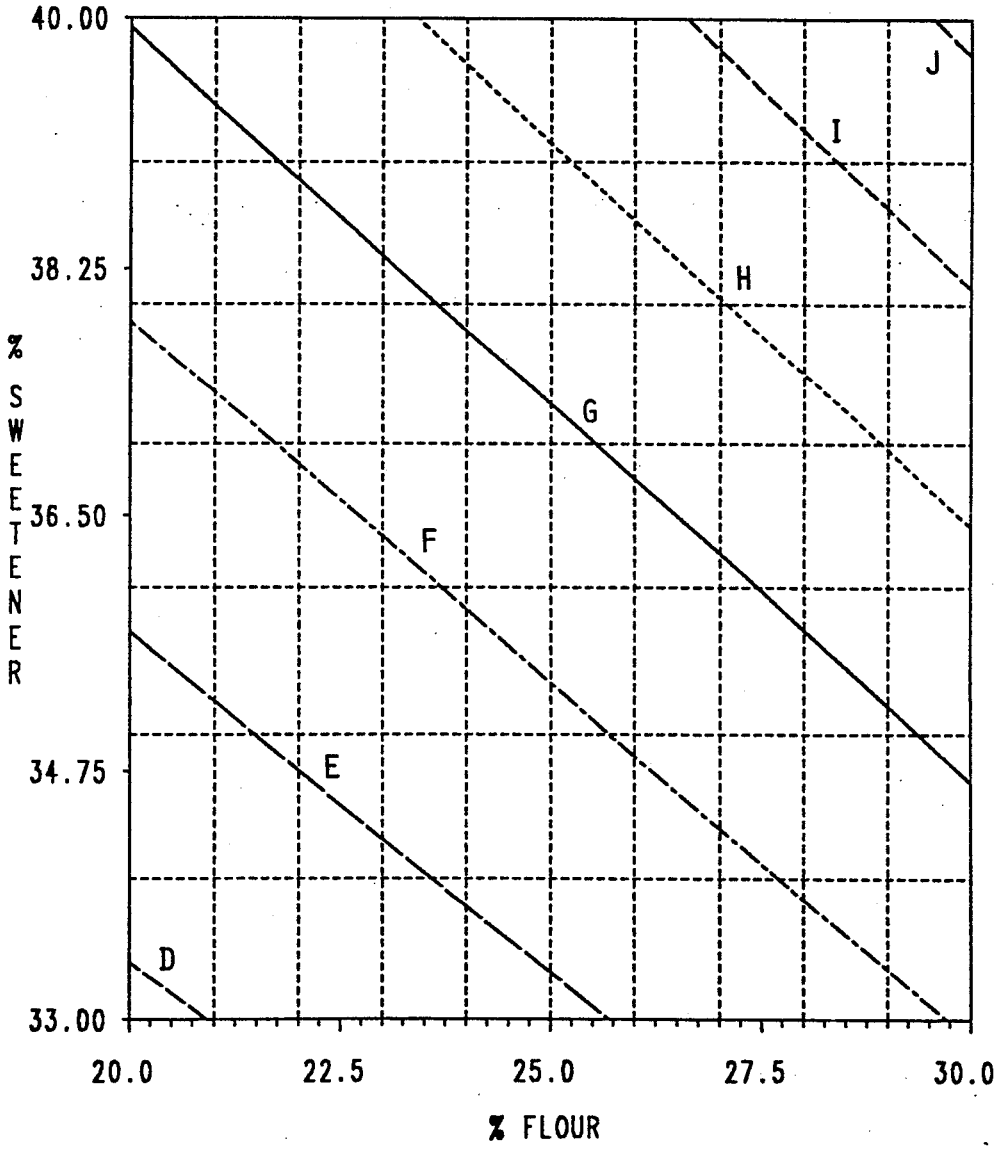
Figure 5A:
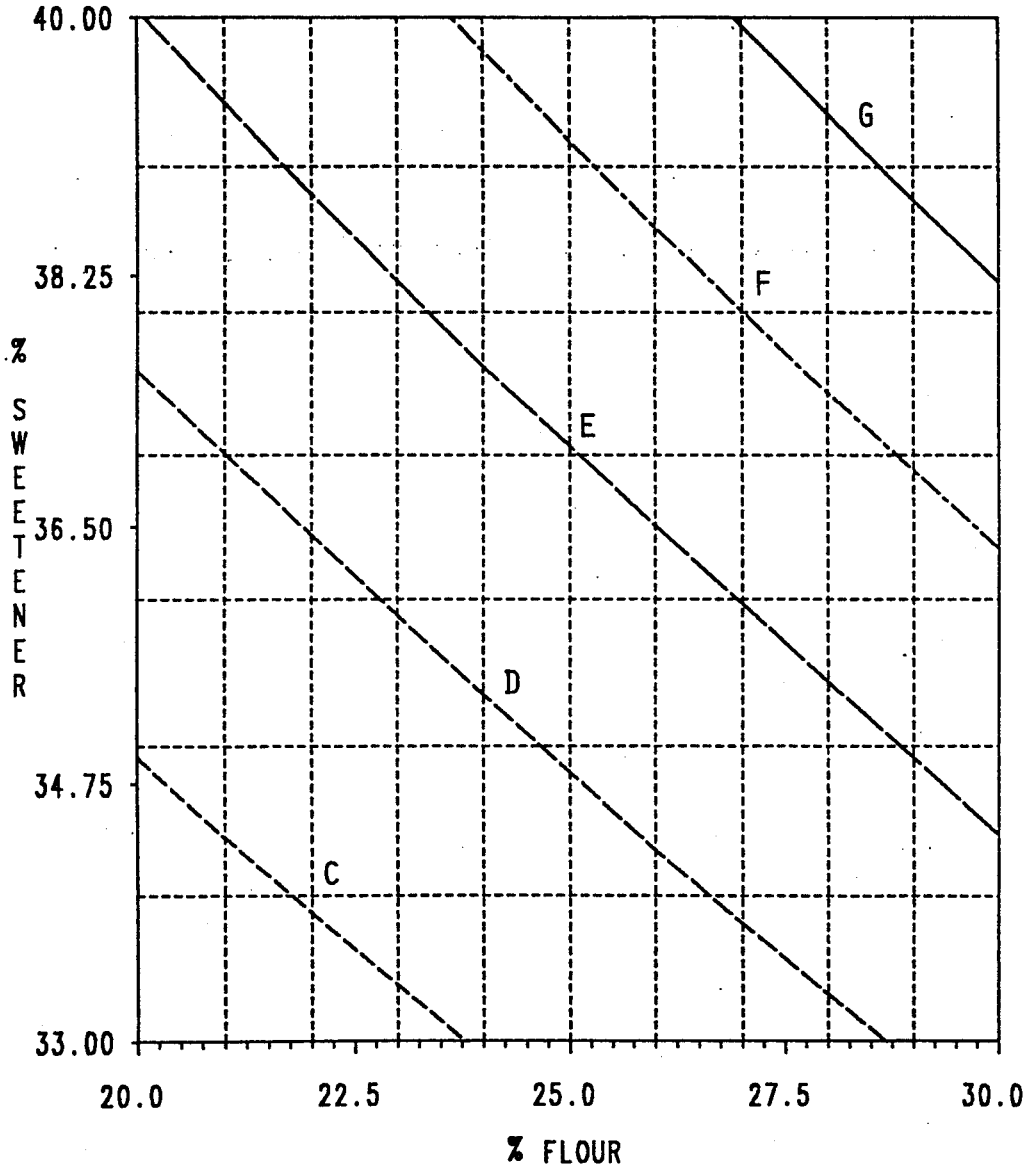
Figure 5B:
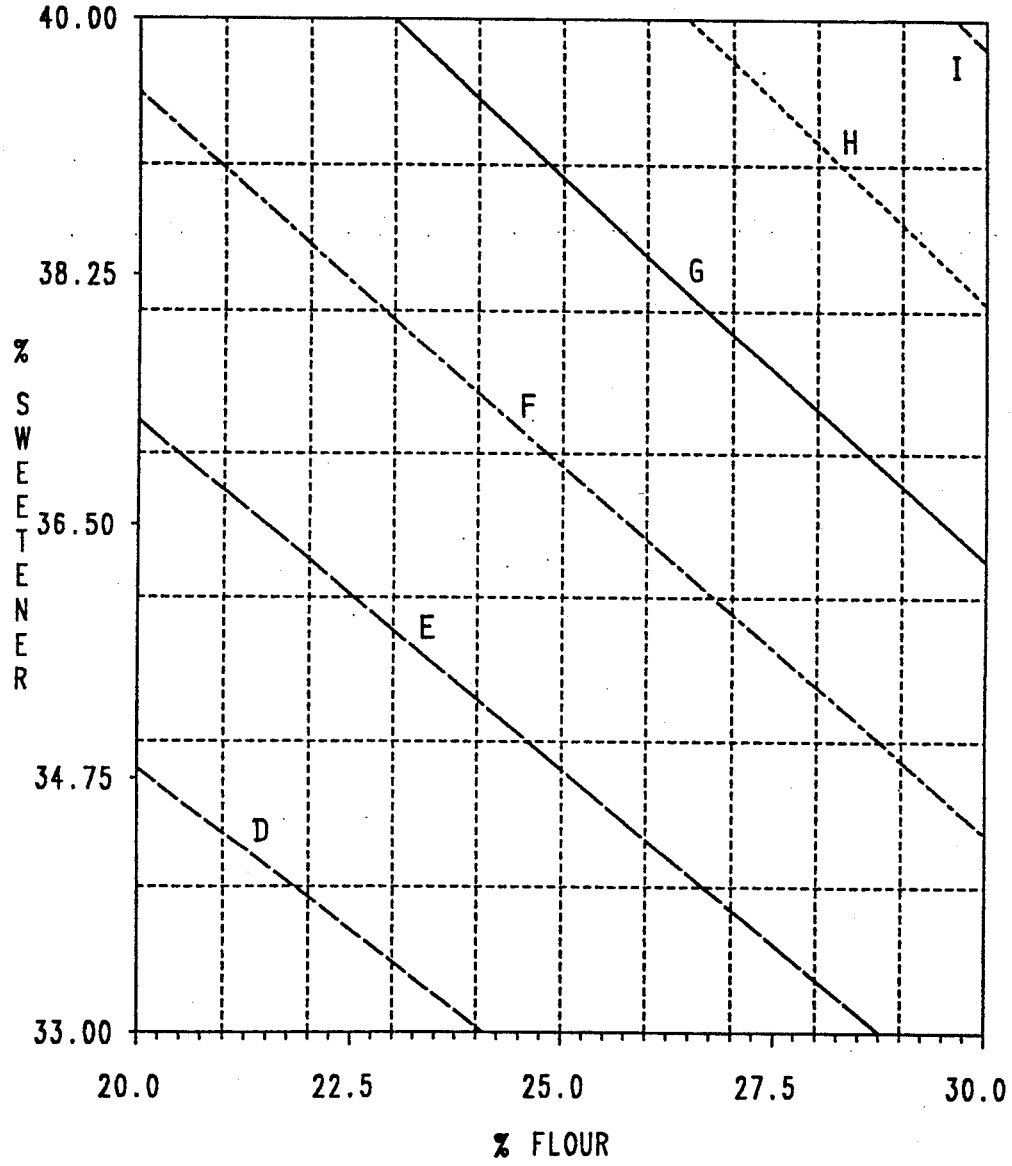
Figure 6A:
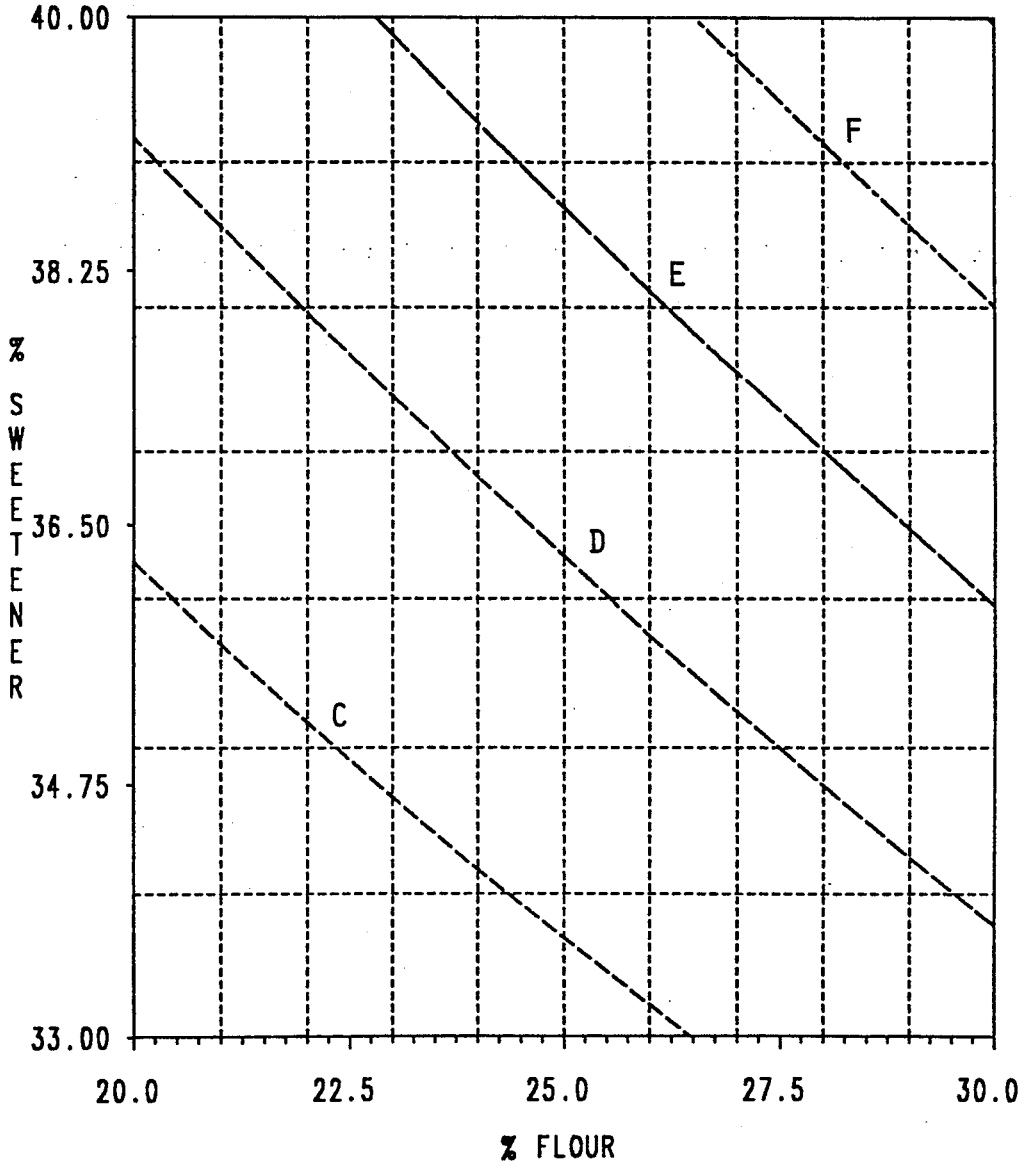
Figure 6B:
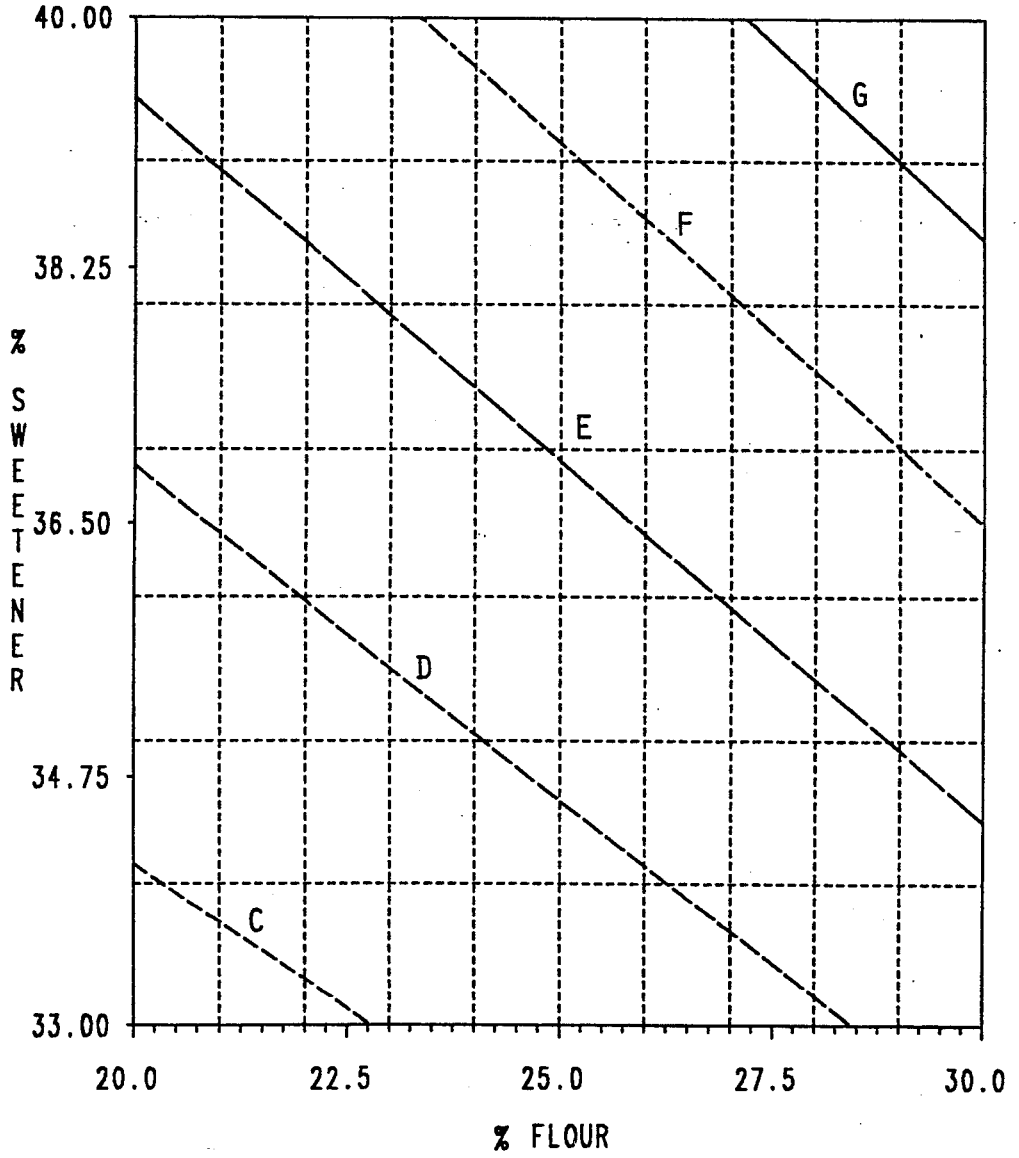
Figure 7A:
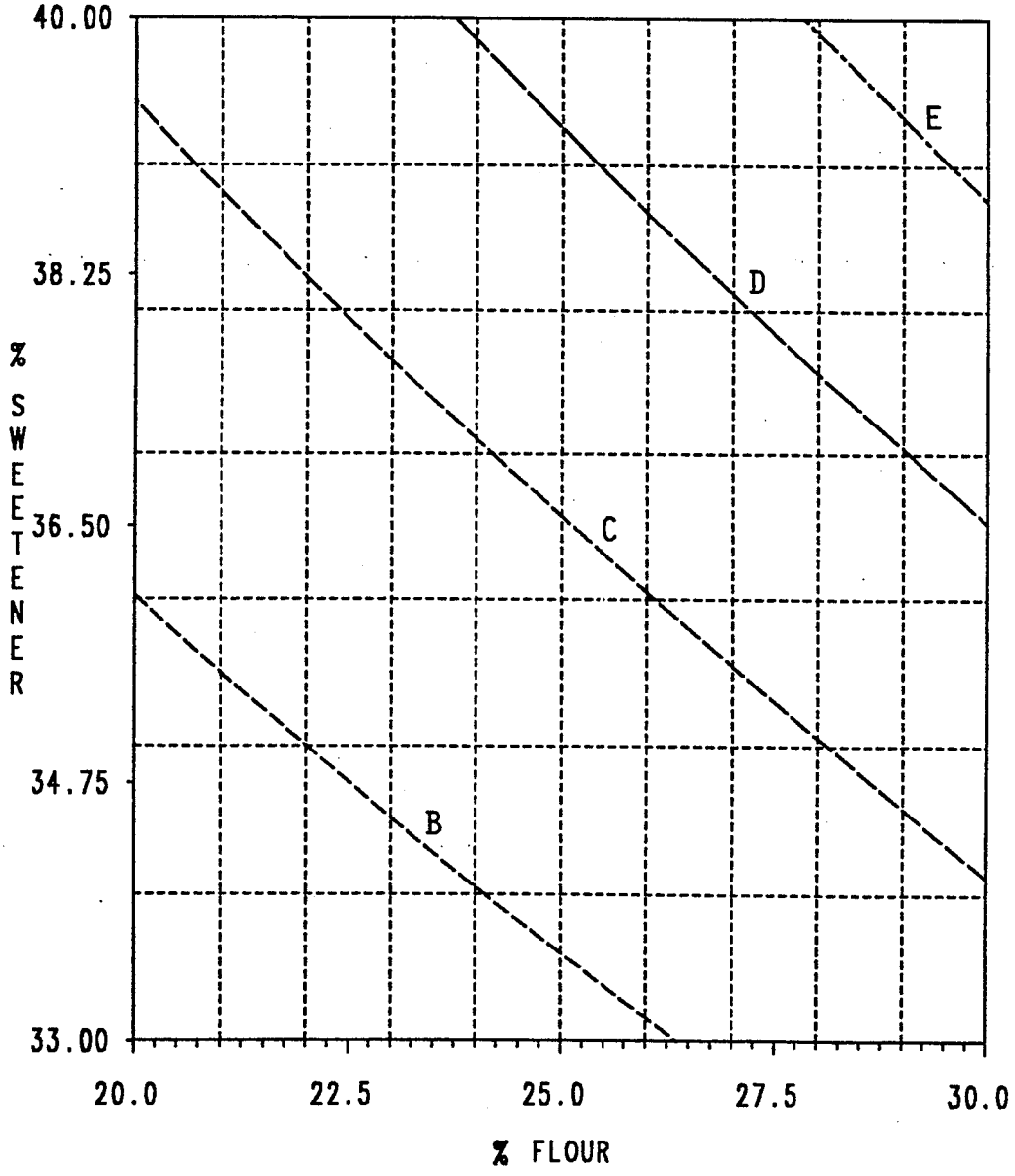
Figure 7B:
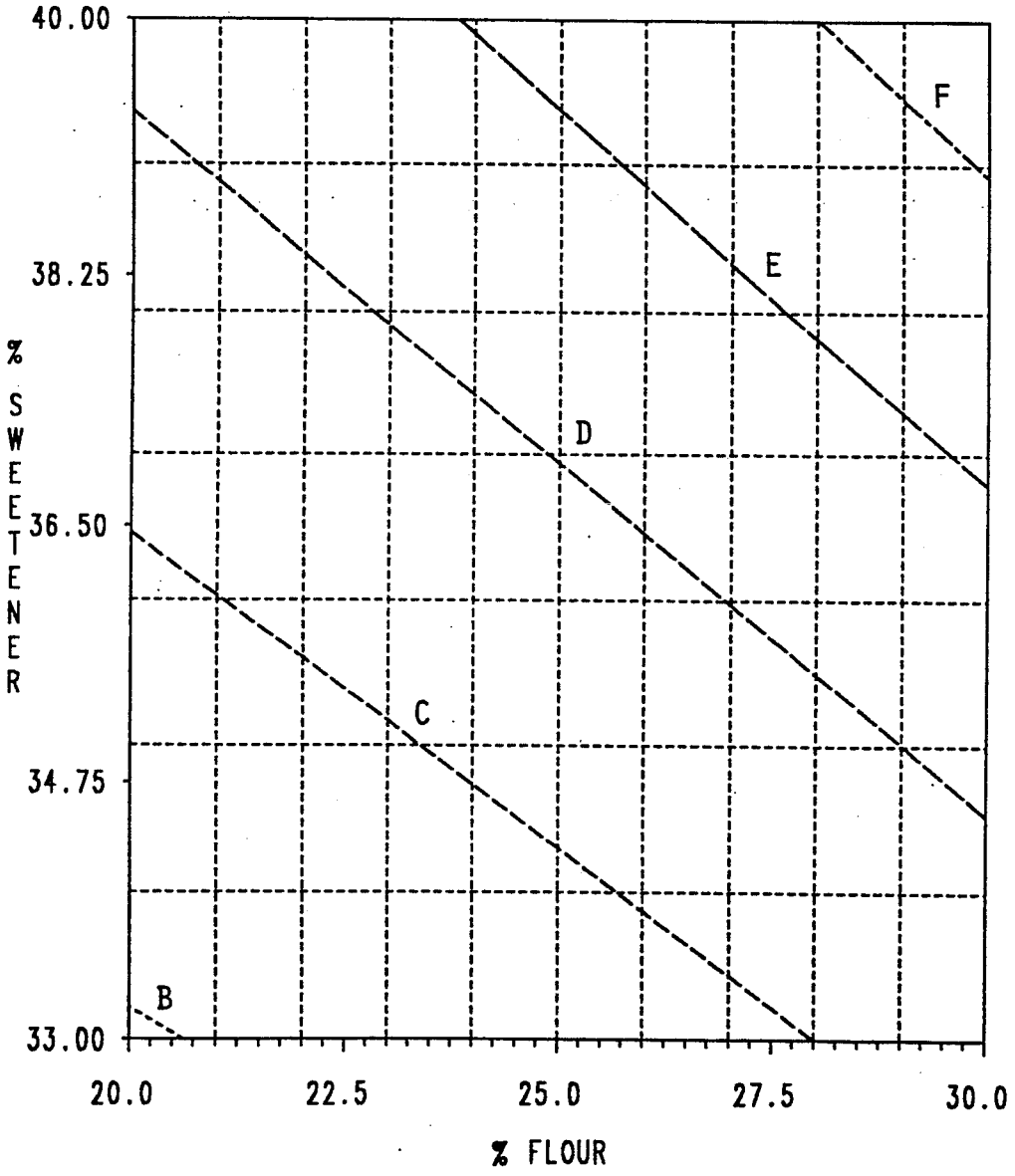

For example, it can be seen from FIG. 2B that the estimated gelatinization temperature of a flour/-sweetener/water blend of about 26%/37%/37% (the sweetener being 90% sucrose and 10% fructose) is about 89° C. (i.e., the intersection of 26% fluor and 37% sweetener is nearly on isotherm H is FIG. 2B). However, it can be seen from FIG. 2A that the predicted gelatinization temperature of that blend is about 88° C. (i.e., the intersection is about midway between isotherm H and isotherm G). Likewise, it can be seen from FIG. 5B that the estimated gelatinization temperature of a 25%/37%/38% blend (sweetener being 50/50 sucrose/fructose) of flour/sweetener/water is about 85° C. (i.e., the intersection of 25% flour and 37% sweetener is nearly on isotherm F.). However, the predicted gelatinization temperature is about 83° C. (i.e., the intersection is nearly on isotherm E). Thus, the partial substitution of fructose for sucrose has a disproportionately greater effect on gelatinization temperature than expected from interpolation of the results from an all sucrose system and an all fructose system.

An analysis of the statistical significance of the data and correlation with the model was made. All non-trivial terms of the models were significant a 95% confidence and the R-square value was 0.989.

Conclusion

Starch gelatinization temperature is greatly influenced by the type of sugar present. Starch requires much less water to reach a given gelatinization temperature in the presence of fructose than sucrose. Also, for given quantities of sweetener, starch and water, starch gelatinization will occur at a lower temperature when the sweetener is fructose rather than sucrose. And the mere presence of fructose appears much more significant than the actual ratio of fructose to sucrose in the starch system.

Differential Scanning Calorimetry is a valuable tool for the study of starch gelatinization in basic systems. From the known interactions of starch, sweeteners and water and their effect on starch gelatinization temperature, models can be generated which will aid in the successful formulation of baked products.

CAKES FORMULATED WITH VARIOUS SWEETENERS

Examples 1–6

The following cake batters were formulated as shown below and cakes prepared therefrom were evaluated.

The formulations shown in Table 2 were mixed and baked as follows. The flour, non-gat dry milk, baking powder and salt were sifted together as dry ingredients and set aside. The eggs and water were blended together as liquid ingredients in a separate container. The sweetener(s) and shortening were creamed together in a Hobbart C-100 mixer, flat paddle, on speed 2 for 30 seconds. One-third of the liquid ingredients were then added followed by mixing on speed 1 for 5 seconds and speed 2 to 45 seconds. One-third of the dry ingredients were then added with the same mixing intervals followed sequentially by the remaining liquid ingredients with the same mixing interval and then the remaining liquid ingredients with the same mixing interval. A 400 gram sample was poured into an 8" pan with parchment liner and was baked for 25–30 minutes in an oven at 350° F. before removal from the pan after 10 minutes ambient cooling.

TABLE 2

YELLOW LAYER CAKE FORMULATIONS

| Fructose Substitution | Example Number | | | | | | |
|---|---|---|---|---|---|---|---|
| (% of Sweetener): | Control | 1 | 2 | 3 | 4 | 5 | 6 |
| Ingredients (Wt. %) | 0 | 10 | 10 | 40 | 40 | 10 | 40 |
| Sucrose | 29.84 | 26.29 | 27.42 | 18.28 | 18.84 | 30.02 | 20.55 |
| Crystalline Fructose (KRYSTAR ® 300, A. E. Staley Mfg. Co.) | 0 | 2.92 | 3.05 | 12.19 | 12.56 | 3.34 | 13.70 |
| Cake Flour | 21.36 | 20.52 | 21.52 | 21.67 | 22.41 | 23.61 | 24.28 |
| Eggs, whole, frozen | 17.01 | 17.01 | 17.01 | 17.01 | 17.01 | 17.01 | 17.01 |
| Shortening, emulsified (Kraft) | 12.14 | 12.14 | 12.14 | 12.14 | 12.14 | 12.14 | 12.14 |
| Water | 16.77 | 18.24 | 15.98 | 15.83 | 14.16 | 11.00 | 9.44 |
| Non-Fat Dry Milk Solids | 1.88 | 1.88 | 1.88 | 1.88 | 1.88 | 1.88 | 1.88 |
| Baking Powder | 0.62 | 0.62 | 0.62 | 0.62 | 0.62 | 0.62 | 0.62 |
| Vanilla | 0.25 | 0.25 | 0.25 | 0.25 | 0.25 | 0.25 | 0.25 |
| Salt | 0.13 | 0.13 | 0.13 | 0.13 | 0.13 | 0.13 | 0.13 |
| | 100.00 | 100.00 | 100.00 | 100.00 | 100.00 | 100.00 | 100.00 |

Three replicates of each of the formulations shown in Table 2 were prepared and evaluated. The results of objective evaluations of the batter and cakes are shown in Table 3 and the results of subjective scoring of the organoleptic properties of the cakes are shown in Table 4.

TABLE 3

| Example Number | Fructose Substitution (% of Sweetener) | Batter Specific Gravity | Batter Temperature (°F.) | Bake Time (Minutes) | Cake Weight (g) | Template Cake Ht. (mm) Sides | Template Cake Ht. (mm) Center |
|---|---|---|---|---|---|---|---|
| A | 0 | 0.82 | 67.7 | 30 | 349.42 | 33.6 | 39.2 |
| 1 | 10 | 0.82 | 71.3 | 30 | 346.45 | 33.0 | 37.0 |
| 2 | 10 | 0.82 | 68.2 | 31 | 352.05 | 34.7 | 39.3 |
| 3 | 40 | 0.82 | 71.7 | 28 | 351.27 | 31.7 | 34.7 |
| 4 | 40 | 0.84 | 67.1 | 29 | 355.05 | 32.8 | 38.0 |
| B | 0 | 0.82 | 68.5 | | 349.41 | 33.3 | 38.7 |
| 5 | 10 | 0.88 | 70.0 | 30 | 356.72 | 33.7 | 32.3 |
| 6 | 40 | 0.87 | 69.3 | 31 | 360.48 | 34.3 | 37.7 |

TABLE 4

| Example Number | Fructose Substitution % of Sweetner | Symmetry | Crust Color | Crumb Grain | Crumb Color | Texture |
|---|---|---|---|---|---|---|
| A | | 3.3 | 3.0 | 3.1 | 3.5 | 3.0 |
| 1 | | 3.0 | 2.7 | 3.2 | 3.5 | 2.7 |
| 2 | | 3.3 | 2.7 | 2.7 | 3.0 | 2.2 |
| 3 | | 2.5 | 3.1 | 2.6 | 3.0 | 2.9 |
| 4 | | 3.1 | 3.1 | 2.8 | 3.3 | 2.7 |
| B | | 2.9 | 3.0 | 3.2 | 3.5 | 3.4 |
| 5 | | 2.0 | 2.8 | 2.7 | 3.5 | 2.2 |
| 6 | | 2.7 | 2.9 | 2.9 | 3.5 | 2.2 |

The experiment was successful in producing structurally acceptable, yellow layer cakes with a blend of crystalline fructose and sucrose. The cakes with the highest overall rank, based on objective and subjective evaluation were the cakes of the Controls and Examples 2 and 4. The cakes produced with the lowest water as a percentage of the formulation, Examples 5 and 6, were unsymmetrical and had the driest crumb.

Examples 7 and 8

A series of yellow layer cakes formulated as 140% high raio cakes were prepared from the ingredients listed in Table 5. The mixing procedures were substantially the same as Example 1–6, except that one-half each of the liquid and dry ingredients were added sequentially (rather than one-third) and the mixing on speed 2 after the addition of each was increased from 30 seconds to 45 seconds.

TABLE 5

140% HIGH RATIO YELLOW LAYER CAKES

| Ingredients (Wt. %) | Example Number Control | 7 | 8 |
|---|---|---|---|
| Cake Flour | 21.36 | 21.80 | 21.80 |
| Sucrose | 29.84 | 21.39 | 21.39 |
| Eggs, whole, frozen | 17.01 | 17.01 | 17.01 |
| Water | 16.77 | 15.63 | 15.63 |
| Shortening (Kraft Emulsified EK-5) | 12.14 | 12.14 | 12.14 |
| Dextrose (STALEYDEX ® 333, A. E. Staley Mfg. Co.) | — | — | 4.79 |
| Crystalline Fructose (KRYSTAR ® 300, A. E. Staley Mfg. Co.) | — | 9.15 | 4.36 |
| NFDM (Land O'Lakes Super Heat) | 1.88 | 1.88 | 1.88 |
| Baking Powder | 0.62 | 0.62 | 0.62 |
| Vanilla (McCormick) | 0.25 | 0.25 | 0.25 |
| Salt | 0.13 | 0.13 | 0.13 |
| | 100.00 | 100.00 | 100.00 |

The cakes were all structurally acceptable and there was no difference in texture.

The formulation of Example 7 produced cakes perceptibly sweeter than the cakes of control. A series of formulations based on the control wherein a 70/30 blend of sucrose/fructose was employed in reduced amounts along with a maltodextrin to make up for the reduced sweetener solids. The extract formulations are shown in Table 5A. Also shown is the total percentage of sweetener in the formulation and the percentage of panelists who judged the cakes of the control to be sweetener than the respective cakes of Examples 7A–7D.

TABLE 5A

140% HIGH RATIO YELLOW LAYER CAKES

| Ingredients (Wt. %) | Example Number 7A | 7B | 7C | 7D |
|---|---|---|---|---|
| Sucrose | 20.50 | 20.12 | 19.75 | 19.38 |
| Crystalline Fructose (KRYSTAR ® 300, A. E. Staley Mfg. Co.) | 8.57 | 8.20 | 7.82 | 7.45 |
| Cake Flour | 21.36 | 21.36 | 21.36 | 21.36 |
| Egg, frozen, whole | 17.01 | 17.01 | 17.01 | 17.01 |
| Shortening (Kraft Emulsified EK-5) | 12.14 | 12.14 | 12.14 | 12.14 |
| Water | 16.80 | 16.80 | 16.80 | 16.80 |
| NFDM (Land O'Lakes Super Heat) | 1.88 | 1.88 | 1.88 | 1.88 |
| Baking Powder | 0.62 | 0.62 | 0.62 | 0.62 |
| Vanilla | 0.25 | 0.25 | 0.25 | 0.25 |
| Salt | 0.13 | 0.13 | 0.13 | 0.13 |
| Maltodextrin (STAR-DRI ® 10, A. E. Staley Mfg. Co.) | 0.74 | 1.49 | 2.24 | 2.98 |
| | 100.00 | 100.00 | 100.00 | 100.00 |
| Total Sweetener | 29.1 | 28.3 | 27.6 | 26.8 |
| Percentage of Panelists | 18.0 | 32.0 | 41.0 | 64.0 |

The percentage of panelists was plotted against the level of total sweetener and the perceived equivalent sweetness point (the point at which 50% of the panelists perceived the cake of the control to be sweeter) was found by interpolation to be 27.36%. Thus, it is inferred that the 29.84% sucrose of Control C can be replaced by a 70/30 sucrose/fructose blend at 27.36% and 2.4% maltodextrin (i.e., an 8.3% reduction in total sweetener solids) and still obtain equivalent sweetness.

Examples 9, 10 and 11

A series of yellow layer cakes formulated as 120% high ratio cakes were prepared as follows from the Ingredients listed in Table 6 below. The ingredients of Group No. 1 were sifted together and blended with Group No. 2, the shortening, in a Hobart C-100 mixer, flat paddles, on speed 1 for 1½ minutes. Group No. 3 was then added and the resulting mixture was creamed at speed 1 until smooth, about 4 minutes. Group No. 4 was mixed in one speed 1 until smooth, about 4 minutes. A sample of 400 grams of the resulting batter was poured into an 8" cake layer pan with parchment liner, baked for about 25–28 minutes, and allowed to cool 10 minutes at ambient before removal from the pan.

TABLE 6

120% HIGH RATIO YELLOW LAYER CAKES

| Group No. | Ingredients (Wt. %) | Control D | Example Number 9 | 10 | 11 |
|---|---|---|---|---|---|
| 1 | Cake Flour | 22.43 | 23.30 | 23.30 | 22.49 |
| | Sucrose | 26.91 | 19.55 | 19.55 | 17.54 |
| | Dextrose (STALEYDEX ® 333, A. E. Staley Mfg. Co.) | — | — | 4.39 | — |
| | Crystalline Fructose (KRYSTAR ® 300, A. E. Staley Mfg. Co.) | — | 8.38 | 3.99 | 7.51 |
| | NFDM (Land O'Lakes Super Heat) | 2.27 | 2.27 | 2.27 | 2.20 |
| | Baking Powder | 1.40 | 1.40 | 1.40 | 1.36 |
| | Salt | 0.70 | 0.70 | 0.70 | |
| | Refined Corn Bran (BEST BRAN TM 90 Ultrafine Corn Bran, A. E. Staley Mfg. Co.) | — | — | — | 2.03 |
| 2 | Shortening (Kraft Emulsified EK-5) | 12.06 | 12.06 | 12.06 | 11.69 |
| 3 | Water | 13.80 | 13.80 | 13.80 | 13.38 |
| | Vanilla (McCormick) | 0.35 | 0.35 | 0.35 | 0.34 |
| 4 | Eggs, whole, frozen | 11.21 | 11.21 | 11.21 | 10.87 |
| | Water | 8.87 | 6.98 | 6.98 | 9.81 |
| | | 100.00 | 100.00 | 100.00 | 100.00 |

All formulations produced structurally acceptable yellow layer cakes with no difference in texture.

Example 12

A pound cake was prepared using a blend of crystalline fructose and sucrose as well as a control using only sucrose as follows from the ingredients listed in Table 7.

TABLE 7

POUND CAKES

| Group No. | Ingredients (Wt. %) | Example Number 12 | Control E |
|---|---|---|---|
| 1 | Sucrose | 24.08 | 27.44 |
| | Cake Flour | 24.45 | 27.44 |
| | Shortening (Kraft Emulsified EK-5) | 16.03 | 16.03 |
| | Water | 8.64 | 10.29 |
| | Crystalline Fructose (KRYSTAR ® 300, A. E. Staley Mfg. Co.) | 8.00 | — |
| | NFDM (Land O'Lakes Super Heat) | 1.44 | 1.44 |
| | Salt | 0.57 | 0.57 |
| 2 | Eggs, whole, frozen | 16.03 | 16.03 |
| | Sweet Dough Flavor (Consumers) | 0.45 | 0.45 |
| | Baking Powder | — | 0.29 |
| | Cornstarch (PFP) | 0.11 | — |
| | Baking Soda | 0.09 | — |
| | Levn-Lite (Monsanto) | 0.09 | — |
| | Vanilla, Conc. Artificial (Consumers) | 0.02 | 0.02 |
| | | 100.00 | 100.00 |

The ingredients of Group No. 1 were placed in a Kitchenaid Mixer (Model K45SS), flat paddle, and blended on speed 2 for 7 minutes. One-third of the eggs were added and then mixed at speed 1 for one minute. An additional one-third of the eggs were added and mixed at speed 1 for one minute followed by addition of the remaining eggs and the remaining ingredients of Group No. 2 with mixing on speed 1 for one minute. Greased 5"×2"×2½" loaf pans were filled with 200 grams of the batter per pan. A spatula blade edge was run through the batter the depth of the cake to cause a center crack of finished product. The batters were baked at 350°. F for 25 minutes and the temperature was raised to 375° F. for the final seven minutes of baking.

Both formulations yielded acceptable pound cakes.

What is claimed is:

1. A method of reformulating a cake mix comprising a crystalline sweetener component and a flour component in a weight ratio of crystalline sweetener component to flour component of from about 1.2 to about 1.4, said flour component consisting essentially of cake flour and said sweetener component consisting essentially of crystalline sucrose, said method comprising replacing from about 20% to about 30% by weight of said crystalline sucrose with crystalline fructose.

2. A method of reformulating a cake mix comprising a crystalline sweetener component and a flour component in a weight ratio of crystalline sweetener component to flour component of from about 1.2 to about 1.4, said flour component consisting essentially of a cake flour and said sweetener component consisting essentially of crystalline sucrose, said method comprising replacing from about 20% to about 40% by weight of said crystalline sucrose with crystalline dextrose in an amount of about 10% to about 20% by weight of said sweetener component and crystalline fructose in an amount of about 10% to about 20% by weight of said sweetener component.

* * * * *